United States Patent
Kipnis

(10) Patent No.: US 11,718,365 B2
(45) Date of Patent: Aug. 8, 2023

(54) VEHICLE WITH PEDALS MOVABLE ALONG SLIDERS

(71) Applicant: Cyclazoom, LLC, Evanston, IL (US)

(72) Inventor: Michael Kipnis, Skokie, IL (US)

(73) Assignee: Cyclazoom, LLC, Skokie, IL (US)

( * ) Notice: Subject to any disclaimer, the term of this patent is extended or adjusted under 35 U.S.C. 154(b) by 379 days.

(21) Appl. No.: 17/133,888

(22) Filed: Dec. 24, 2020

(65) Prior Publication Data

US 2021/0171152 A1 Jun. 10, 2021

Related U.S. Application Data

(60) Division of application No. 16/072,211, filed as application No. PCT/US2017/015596 on Jan. 30, (Continued)

(51) Int. Cl.
*B62M 1/24* (2013.01)
*B62M 1/28* (2013.01)
(Continued)

(52) U.S. Cl.
CPC .............. *B62M 1/24* (2013.01); *B62M 1/28* (2013.01); *B62M 1/30* (2013.01); *B62M 1/32* (2013.01);
(Continued)

(58) Field of Classification Search
CPC . B62M 1/24; B62M 1/28; B62M 1/30; B62M 1/32; B62M 6/00; B62M 9/02;
(Continued)

(56) References Cited

U.S. PATENT DOCUMENTS

| 608,674 A | 8/1898 | Harshner |
| 2,141,967 A | 12/1938 | Ball, Jr. |

(Continued)

FOREIGN PATENT DOCUMENTS

| CN | 2799373 Y | 7/2006 |
| CN | 102361789 A | 2/2012 |

(Continued)

OTHER PUBLICATIONS

Search Report and Written Opinion for International Application No. PCT/US17/015596 dated May 26, 2017.
(Continued)

*Primary Examiner* — Tony H Winner
*Assistant Examiner* — Marlon A Arce
(74) *Attorney, Agent, or Firm* — Brian Roffe

(57) ABSTRACT

Vehicle includes a frame, a seat arranged on the frame, a wheel rotatably mounted on the frame, an elongate directional slider, a pedal on the directional slider that slides between first and second positions, a main drive chain connected to the first wheel, a main drive sprocket that rotates the main drive chain and thus the first wheel, a flywheel that rotates the main drive sprocket, and an energy generating system that converts sliding of the pedal on the directional slider into rotational force to rotate the flywheel. The energy generating system may include a first electrical coil assembly connected to the pedal, a second electrical coil assembly in connection with the directional slider and that cooperates with the first electrical coil assembly to cause generation of electricity, and an electrical motor that is powered by the generated electricity and is coupled to the flywheel to rotate the flywheel.

20 Claims, 11 Drawing Sheets

Related U.S. Application Data 2017, now Pat. No. 10,875,599, and a continuation-in-part of application No. 15/412,962, filed on Jan. 23, 2017, now Pat. No. 10,167,046.

(60) Provisional application No. 62/288,611, filed on Jan. 29, 2016.

(51) Int. Cl.
*B62M 1/30* (2013.01)
*B62M 1/32* (2013.01)
*B62M 6/00* (2010.01)
*B62M 23/00* (2006.01)
*B62M 9/02* (2006.01)
*B62K 3/00* (2006.01)
*B62M 6/55* (2010.01)
*B62M 6/90* (2010.01)

(52) U.S. Cl.
CPC .............. *B62M 6/00* (2013.01); *B62M 9/02* (2013.01); *B62M 23/00* (2013.01); *B62K 3/005* (2013.01); *B62M 6/55* (2013.01); *B62M 6/90* (2013.01)

(58) Field of Classification Search
CPC .......... B62M 23/00; B62M 6/55; B62M 6/90; B62K 3/005
See application file for complete search history.

(56) References Cited

U.S. PATENT DOCUMENTS

| | | | |
|---|---|---|---|
| 3,039,790 A | 6/1962 | Trott | |
| 3,873,128 A | 3/1975 | Dunder et al. | |
| 3,888,334 A | 6/1975 | Mack | |
| 3,954,282 A | 5/1976 | Hege | |
| 4,026,571 A | 5/1977 | Vereyken | |
| 4,077,648 A | 3/1978 | Seul | |
| 4,134,481 A | 1/1979 | Calderazzo | |
| 4,456,276 A | 6/1984 | Bortolin | |
| 4,574,649 A | 3/1986 | Seol | |
| 4,666,173 A | 5/1987 | Graham | |
| 4,700,962 A | 10/1987 | Salmon | |
| 4,772,252 A | 9/1988 | Bona | |
| 4,846,488 A | 7/1989 | Szadkowski | |
| 4,878,684 A | 11/1989 | Lemle | |
| 5,035,417 A * | 7/1991 | Ross .................. A63B 22/0605 | |
| | | | 74/48 |
| 5,035,678 A | 7/1991 | Hageman | |
| 5,272,928 A | 12/1993 | Young | |
| 5,290,054 A | 3/1994 | Po | |
| 5,527,246 A | 6/1996 | Rodgers | |
| 5,732,963 A | 3/1998 | White | |
| 5,915,710 A | 6/1999 | Miller | |
| 5,979,922 A | 11/1999 | Becker et al. | |
| 6,000,707 A | 12/1999 | Miller | |
| 6,007,083 A | 12/1999 | Currie | |
| 6,173,981 B1 | 1/2001 | Coleman | |
| 6,209,900 B1 | 4/2001 | Yoshizawa | |
| 6,237,928 B1 | 5/2001 | Islas | |
| 6,340,067 B1 | 1/2002 | Fujiwara et al. | |
| 6,412,802 B1 | 7/2002 | Kugel et al. | |
| 6,699,161 B1 * | 3/2004 | Speas ....................... B62M 9/00 | |
| | | | 482/61 |
| 6,730,003 B1 | 5/2004 | Phillips | |
| 6,827,362 B2 | 12/2004 | Smith et al. | |
| 7,048,290 B2 | 5/2006 | Paquette | |
| 7,326,137 B2 | 2/2008 | van der Linde | |
| 7,497,453 B2 | 3/2009 | Fan | |
| 7,559,264 B2 | 7/2009 | Qian | |
| 7,753,387 B2 | 7/2010 | Wei | |
| 7,946,963 B1 * | 5/2011 | Schreiner ......... A63B 23/03575 | |
| | | | 280/223 |
| 8,157,281 B2 | 4/2012 | Wang | |
| 8,215,654 B1 | 7/2012 | Leser | |
| 8,689,957 B2 | 4/2014 | Christini et al. | |
| 8,857,839 B2 | 10/2014 | Scolari et al. | |
| 8,955,861 B1 | 2/2015 | Rasiah | |
| 8,967,022 B2 | 3/2015 | Beard | |
| 8,979,107 B2 | 3/2015 | Lin | |
| 9,688,349 B2 | 6/2017 | Thompson | |
| 9,815,519 B2 | 11/2017 | Zhou et al. | |
| 9,850,992 B2 | 12/2017 | Valle | |
| 10,457,348 B2 | 10/2019 | Voss | |
| 2002/0053779 A1 | 5/2002 | Fujiwara et al. | |
| 2002/0074788 A1 | 6/2002 | Fujiwara et al. | |
| 2003/0193160 A1 | 10/2003 | Mehmet | |
| 2007/0085297 A1 * | 4/2007 | Eugene Cruft .......... B62M 1/24 | |
| | | | 280/252 |
| 2007/0228687 A1 | 10/2007 | Parker | |
| 2011/0049830 A1 | 3/2011 | Hung | |
| 2011/0057411 A1 | 3/2011 | Scolari et al. | |
| 2011/0115190 A1 | 5/2011 | McIsaac | |
| 2011/0266768 A1 | 11/2011 | Kohlheb et al. | |
| 2014/0210179 A1 | 7/2014 | Sprague | |
| 2014/0367940 A1 | 12/2014 | Lin | |
| 2015/0076787 A1 | 3/2015 | Kipnis | |
| 2016/0046351 A1 * | 2/2016 | Thomas ............... A63B 21/227 | |
| | | | 482/57 |
| 2016/0159435 A1 * | 6/2016 | Yehuda .................... B62M 9/00 | |
| | | | 180/220 |
| 2016/0310786 A1 * | 10/2016 | Prosnitz ................... B62M 1/26 | |
| 2017/0217536 A1 | 8/2017 | Kipnis | |
| 2017/0368409 A1 * | 12/2017 | Felker .................. B62K 21/125 | |

FOREIGN PATENT DOCUMENTS

| | | |
|---|---|---|
| WO | 2006002577 A1 | 1/2006 |
| WO | 2006059003 A1 | 6/2006 |
| WO | 2010084363 A1 | 7/2010 |
| WO | 2014021702 A | 2/2014 |
| WO | 2017132658 A1 | 8/2017 |

OTHER PUBLICATIONS

Partial Supplementary European Search Report for EP 17745075.6 dated Oct. 31, 2019.
Extended European Search Report for EP 17745075.6 dated Feb. 10, 2020.
Office Action for Chinese patent application No. 201780008408.5 dated Dec. 31, 2019.

* cited by examiner

VEHICLE WITH PEDALS MOVABLE ALONG SLIDERS

CROSS REFERENCE TO RELATED APPLICATIONS

This application is a divisional of U.S. patent application Ser. No. 16/072,211 filed Jul. 24, 2018, now U.S. Pat. No. 10,875,599, which is a National Stage of International Application No. PCT/US17/15596 filed Jan. 30, 2017 which claims priority of U.S. provisional patent application Ser. No. 62/288,611 filed Jan. 29, 2016, and U.S. patent application Ser. No. 15/412,962 filed Jan. 23, 2017, now U.S. Pat. No. 10,167,046, all of which are incorporated by reference herein.

FIELD OF THE INVENTION

This invention relates to human-powered vehicles such as bicycles, tricycles and other multi-wheel variants and specifically to such human-powered vehicles propelled by a reciprocating thrust motion of the operator using a double bump drive hammer powered mechanism connected by a power-gear to a double overrunning clutch transmission with optional returning springs. The human-powered vehicle is propelled using pedals/hammers positioned in between wheels or approximately above and on either side of the front wheel.

BACKGROUND OF THE INVENTION

Recumbent human-powered vehicles, such as bicycles and tricycles and human-powered vehicles with linear drivers, are known in the prior art. Some examples of such vehicles are found in U.S. Pat. Nos. 4,574,649; 4,846,488; 4,878,684; 5,272,928; 5,290,054; 5,732,963; 5,915,710; 5,979,922; 6,173,981; and 7,048,290; and WO 2006002577.

SUMMARY OF THE INVENTION

A vehicle in accordance with the invention includes a frame, a seat arranged on the frame, a wheel rotatably mounted on the frame, an elongate directional slider, a pedal on the directional slider that slides between first and second positions, a main drive chain connected to the first wheel, a main drive sprocket that rotates the main drive chain and thus the first wheel, a flywheel that rotates the main drive sprocket, and an energy generating system that converts sliding of the pedal on the directional slider into rotational force to rotate the flywheel.

The energy generating system may include a first electrical coil assembly connected to the pedal, a second electrical coil assembly in connection with the directional slider and that cooperates with the first electrical coil assembly to cause generation of electricity, and an electrical motor that is powered by the generated electricity and is coupled to the flywheel to rotate the flywheel. Wires may be used to convey electricity to the motor, which is as such, or otherwise, electrically coupled to the flywheel.

An additional directional slider may be provided on an opposite side of the frame from a side on which the directional slider is situated, and an additional pedal provided on the additional directional slider that slides between first and second positions. The energy generating system converts sliding of the additional pedal on the additional directional slider into rotational force to rotate the flywheel. In this case, the energy generating system includes a first electrical coil assembly connected to the pedal, a second electrical coil assembly in connection with the directional slider and that cooperates with the first electrical coil assembly to cause generation of electricity, a third electrical coil assembly connected to the additional pedal, a fourth electrical coil assembly in connection with the additional directional slider and that cooperates with the third electrical coil assembly to cause generation of electricity, and an electrical motor that is powered by the generated electricity and is coupled to the flywheel to rotate the flywheel. Movement of the pedal on the directional slider is independent of movement of the additional pedal on the additional directional slider.

The directional slider may be vertically oriented on the frame such that the pedal is movable in a vertical, linear movement. In this case, the vehicle optionally includes a spring at a top of the directional slider in an upward path of the pedal to limit upward movement of the pedal on the directional slider and/or a spring at a bottom of the directional slider in an downward path of the pedal to limit downward movement of the pedal on the directional slider. Each spring or both springs may be a reciprocating electrical spring that generates electrical power and returns force at the same time, the spring being part of the energy generating system. An additional spring may be provided at the bottom of the directional slider below the spring and which is attached to the frame.

The vehicle may include an additional wheel in front of the wheel such that the additional wheel is a front wheel of the vehicle and the wheel is a rear wheel of the vehicle. The directional slider is situated between the front and rear wheels. A seat is provided rearward of the directional slider and a handlebar in front of the directional slider.

In another embodiment, the directional slider is horizontally oriented on the frame such that the pedal is movable in a horizontal, linear movement. The vehicle may include an additional wheel in front of the wheel such that the additional wheel is a front wheel of the vehicle and the wheel is a rear wheel of the vehicle. In this case, the directional slider is preferably situated at least partly over the front wheel. A seat is rearward of the directional slider and a handlebar in front of the directional slider, with the seat including a backrest. Optionally, a first spring is at a front of the directional slider in a forward path of the pedal to limit forward movement of the pedal on the directional slider, and a second spring is at a rear of the directional slider in a rearward path of the pedal to limit rearward movement of the pedal on the directional slider.

BRIEF DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

Figure 1:
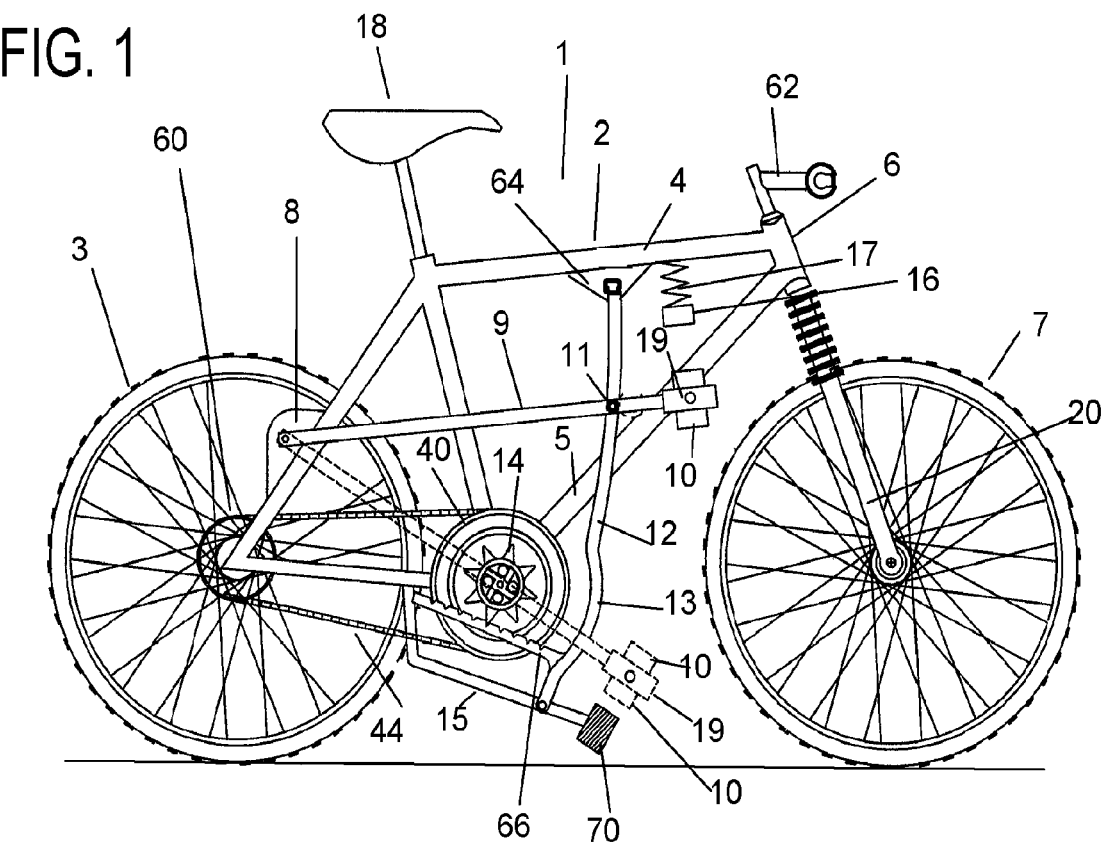
FIG. 1 is a side view of an embodiment of upright seated position of the present invention incorporating hammer handle pedals/hammers weights attached to it.

Referring to FIGS. 1-13, a bicycle 1 has a double-stroke inertial hammer-powered gear drive mechanism 10, 12, 13, 14 integral with a bicycle frame 2, The bicycle 1 has many of the standard components found in typical bicycles, such as a rear wheel 3, top tube 4, low tube 5, steering column 6, front wheel 7, main drive sprocket 40, main drive chain 44, rear wheel drive sprocket 60, adjustable handlebar 62, and a front fork 20. Bicycle 1 may include alternative or other components known to be used on bicycles as long as they do not interfere with the motive system to be disclosed.

The hammer-powered gear drive mechanism of the bicycle 1 includes leading adjustable sliders and gears 12, bumps 13, and is engaged with follower left and right gears 14. This arrangement is shown on the right side of the bicycle 1 in FIG. 1, with a leading slider and gear 12, a bump 13 and right side gear 14 shown, but the same combination of components, i.e., a leading slider and gear 12, a bump 13 and the left side gear 14, are present on the left side of the bicycle 1. The description will generally discuss one combination of these components, it being understood that the opposite side of the frame 2 includes the same components.

Each leading slider and gear 12 serves as a guide member that moves in conjunction with movement of an inertial hammer weight 10. Movement of this guide member is converted by the energy transfer system coupled thereto into motive power to rotate the rear wheel 3 only when the weight 10 moves in a direction from a first position (an upper position shown in solid lines in FIG. 1) to a second position (a lower position show in dotted lines in FIG. 1), i.e., downward in the configuration shown in FIG. 1 and not when the weight 10 moves in the opposite direction from the second position to the first position (upward). Various forms of this guide member and energy transfer system are possible.

Leading slider and gear 12 is joined by a roller 11 with the hammer handle 9 and the inertial hammer weight 10, combined with a pedal 19. Weight 10 is fixed to the hammer handle 9 and the pedal 19 is fixed to the weight 10, although it could alternatively or additionally be fixed to the hammer handle 9.

Roller 11 is fixed to the hammer handle 9 but can rotate in this fixed position (rotatably mounted to the hammer handle 9) and is positioned in connection with the leading slider and gear 12 to be guided in its reciprocating up and down sliding movement by the leading slider and gear 12. As the hammer handle 9 pivots relative to its pivot point on a bracket 8 fixed to the frame 2, the radial distance of the roller 11 from the pivot point on the bracket 8 does not change, but rather, the leading slider and gear 12 pivots about its pivot point on another bracket 64 fixed to the frame 2. Bracket 8 is fixed to a part of the frame 2 leading to the axle of the rear wheel 3. Bracket 64 is fixed to the top tube 4 of the frame 2.

Hammer handle 9 and leading slider and gear 12 are jointed with or connected to the frame 2 by the brackets 8, 64, one bracket 8 supporting the fixed end of the hammer handle 9 and the other bracket 64 supporting the upper end of the leading slider and gear 12. Bracket 64 can support the leading slider and gear 12 on both sides of the bicycle 1, or two brackets 64 can be provided, whereas a separate bracket 8 is usually required on each side of the bicycle 1 to support a respective hammer handle 9. With such fixing of the pedal 19, weight 10 and hammer handle 9 to one another and the hammer handle 9 to the bracket 8, downward movement of the pedal 19, caused by force exerted by the rider of the bicycle 1, causes downward movement of the weight 10 and pivotal downward movement of the hammer handle 9 relative to the pivot point defined on the bracket 8. Upward movement of the pedal 19 causes upward movement of the weight 10 and pivotal upward movement of the hammer handle 9 relative to the pivot point defined on the bracket 8.

Inertial hammer weight 10 along with the driver's own body weight creates a pendulum-type oscillation movement of the hammer handle 9 resulting in guided movement of the roller 11 along the leading slider and gear 12. Springs 15, 16, 17, 70 provide movement control of the inertial weight 10, resisting shocks and creating an additional reciprocating force. By passing bump 13, the roller 11 creates a high power movement of leading slider and gear 12 and rotating following gear 14. Springs 16 and 17 are positioned on the underside of the top tube 4 to first limit the upward movement of the weight 10 and second to provide a reciprocating force if the weight 10 should come into contact with the lowermost spring 16 in its upward stroke. With respect to the downward stroke, springs 15 and 70 are positioned to first limit the downward movement of the weight 10 (shown in dotted lines in FIG. 1) and second to provide a reciprocating force if the weight 10 should come into contact with the spring 70 in its downward stroke. Spring 15 may be fixed to the frame 2. With the springs 16, 70 in fixed positions, the weight 10 has a defined path of movement, effected by the rider moving the pedals 19.

Bump 13 is formed by providing the leading slider and gear 12 with a deviation radially outward of its radius of curvature, or a deviation from a straight path. Preferably, the bump 13 is curved to provide for easy passage of the roller 11 therethrough. The dotted lines along the leading slider and gear 12 represent the path of the roller 11. However, each leading slider and gear 12 is not configured to correspond to this path and enable the roller 11 to move in this path, but rather have the bump 13. The bump 13 thereby causes the leading slider and gear 12 to pivot rearward about the pivot point defined on the bracket 64 as the roller 11 passes through the bump 13. This pivotal rearward movement causes rearward movement of a ratchet portion 66 of the leading slider and gear 12 which is engaged with a gear 14 of the drive mechanism, thereby causing rotation of the gear 14.

Ratchet portion 66 extends from the bump 13, and since the leading slider and gear 12 is generally in a vertical orientation, the ratchet portion 66 extends in a generally horizontal orientation. The length and construction of the ratchet portion 66 of the leading slider and gear 12 is determined relative to the extent of its rearward movement and the size and shape of the teeth on the gear 14. Other variables relating to the construction of and coupling between the ratchet portion 66 of the leading slider and gear 12 and the gear 14 to enable a maximal portion of the force of the downward stroke applied by the rider to the pedals 19 to be converted into rotation of the gear 14 are readily determinable by one skilled in the art to which this invention pertains in view of the disclosure herein.

Figure 11:
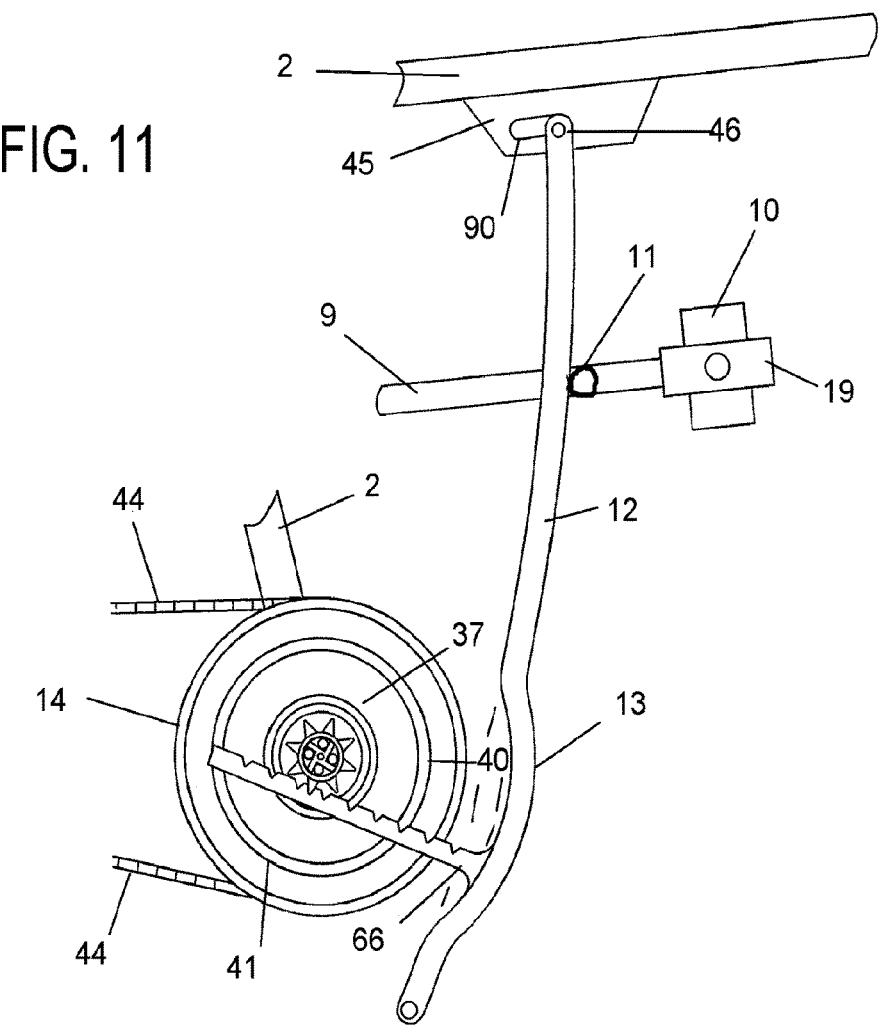
FIG. 11 is a side view of a particular embodiment of the transmission of the present invention utilizing movable leading slider gear axle and therefore changeable bump height.
Figure 12:
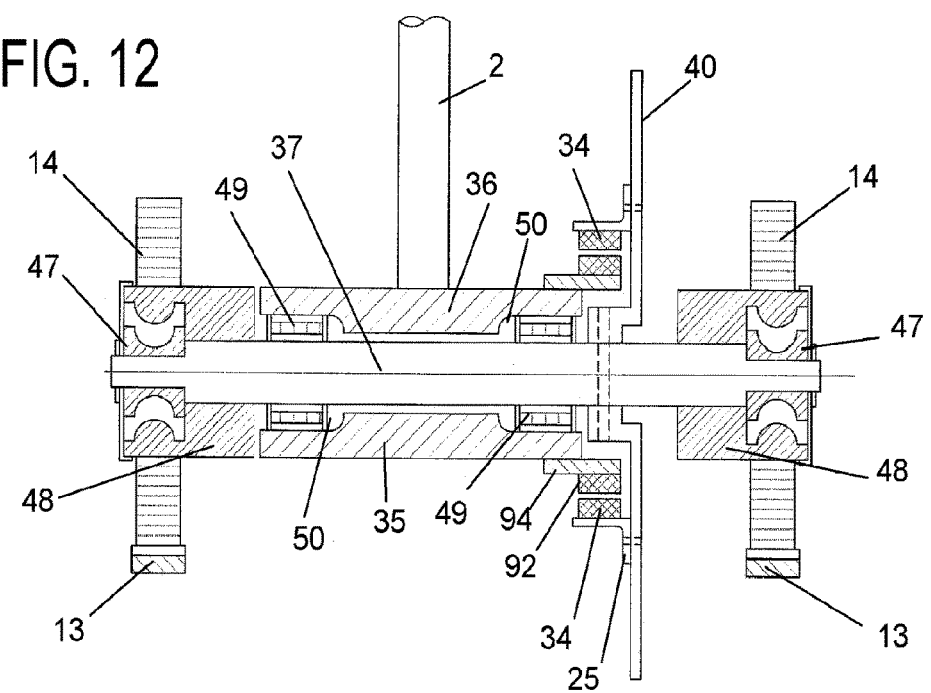
FIG. 12 is a cross-sectional view of particular embodiment of the transmission of the present invention utilizing hydraulic overrunning latches, hydraulic self-pressure bearings, electrical generator, and flywheel.
Figure 13:
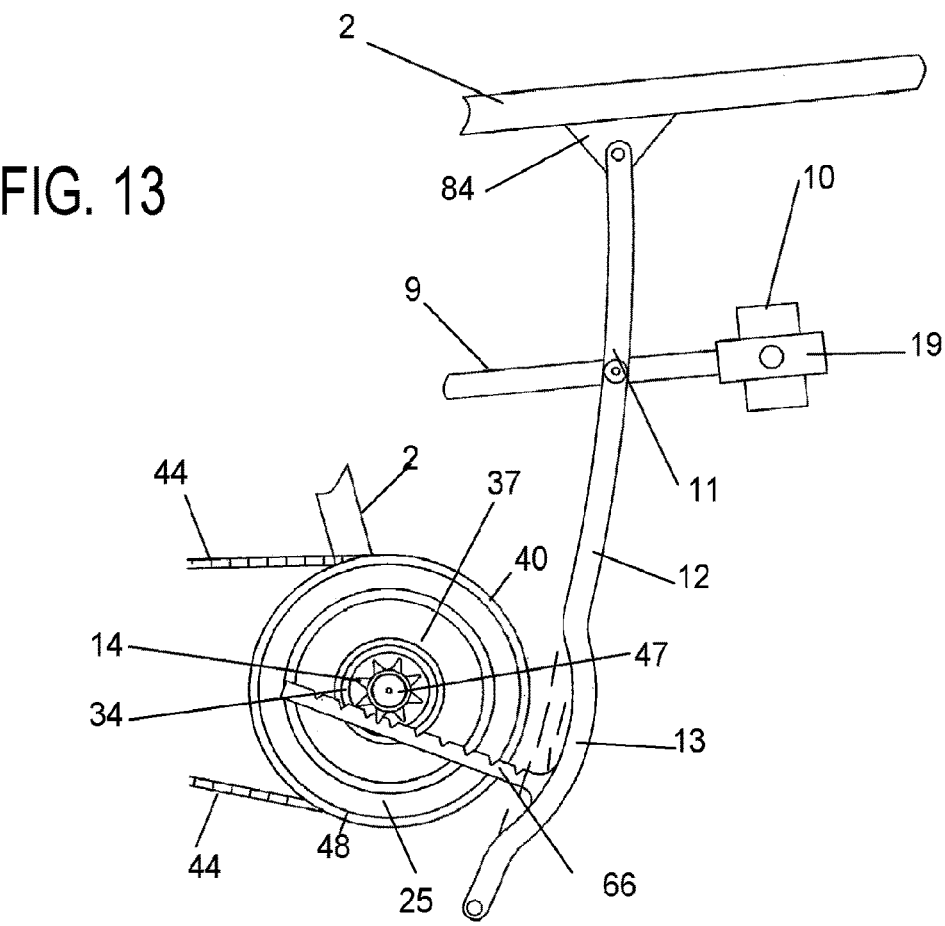
FIG. 13 is a side view of a particular embodiment of the transmission and inertial hammer powered drive mechanism of the present invention utilizing hydraulic overrunning latches, hydraulic self-pressure bearings, electrical generators, and flywheels.

Gears 14, one on each side for the frame 2, transmit power to the single main drive sprocket wheel 40 by overrunning clutches having outer and inner rings 41 and 42 (see FIGS. 8-11) or outer and inner rings 47 and 48 (see FIGS. 12 and 13). As the gear 14 rotates, the main drive sprocket wheel 40 rotates causing the main drive chain 44 threaded over it to move and the rear wheel drive sprocket 60, over which the main drive chain is threaded, to rotate thereby causing rotation of the rear wheel 3 to which the rear wheel drive sprocket 60 is connected.

Figure 2:
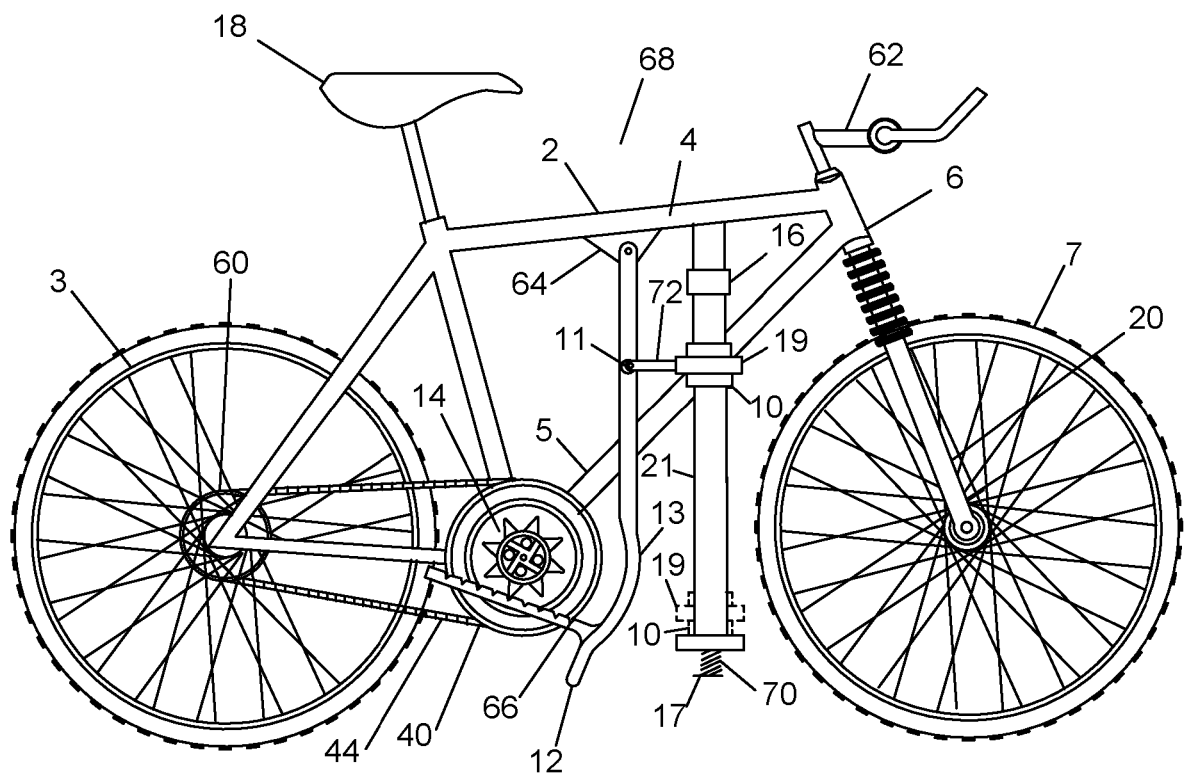
FIG. 2 is a side view of an embodiment of the present invention, incorporating vertical slider for pedals/hammers weights.

FIG. 2 shows an embodiment of a bicycle 68 similar to the bicycle 1 shown in FIG. 1 with the exception that each hammer handle 9 is replaced by a directional slider 21 attached to the top tube 4, i.e., there is a directional slider 21 on each side of the frame 2 of the bicycle 68. The directional slider 21 may be fixed to the frame 2 and, as illustrated, is substantially vertical, although the angle between the main axis of the directional slider 21 and the top tube 4 of the frame 2 may vary or be variable depending on, for example, rider preference.

Weight 10 is connected to the directional slider 21 to enable it to slide up and down along the directional slider 21, an upper position of the weight 10 being shown in solid lines and a lowermost position of the weight along the directional slider 21 being shown in dotted lines. Pedal 19 is attached to the weight 10 for movement along with the weight 10, and a bracket or connector 72 joins the pedal 19 to the leading slider and gear 12 via a roller 11. Thus, the roller 11 is rotatably connected to the connector 72 and moves up and down dependent on the up and down movement of the pedal 19, and connected weight 10.

Spring 16 situated at the top of the directional slider 21 limits upward movement of the weight 10 along the directional slider 21 and provides a reciprocating force if the weight 10 should come into contact with the spring 16 in its upward stroke. Spring 70 situated at the bottom of the directional slider 21 limits downward movement of the weight 10 along the directional slider 21 and provides a reciprocating force if the weight 10 should come into contact with the spring 70 in its downward stroke. Spring 17 is optionally positioned below the lowermost spring 70. There may be any number of upper and lower springs at the end regions of the directional slider 21.

In FIG. 2, the roller 11 moves downward as the rider forces the pedal 19 downward causing the weight 10 to move downward along the directional slider 21. The roller 11 also moves downward in a straight path and when it reaches the bump 13 in the leading slider and gear 12, it cases the leading slider and gear 12 to pivot rearward about the pivot point on the bracket 64, and the ratchet portion 66 of the leading slider and gear 12 to move rearward while in contact with the gear 14. As the gear 14 rotates, the main drive sprocket wheel 40 rotates causing the main drive chain 44 to move and the rear wheel drive sprocket 60 to rotate thereby causing rotation of the rear wheel 3. Ratchet portion 66 extends from a portion of the leading slider and gear 12 below the bump 13. Comparing FIGS. 1 and 2, it can be seen that the ratchet portion 66 can extend from either the bump 13 itself or another part of the leading slider and gear 12.

Figure 3:
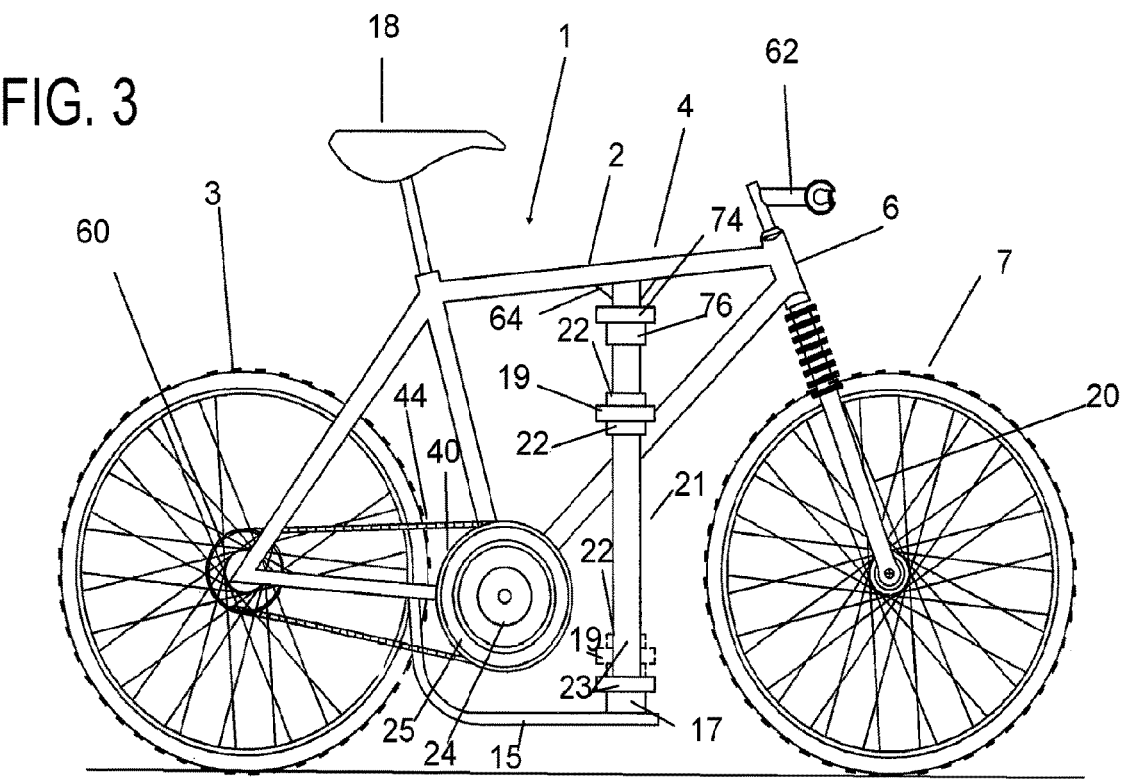
FIG. 3 is a side view of an embodiment of the present invention, incorporating vertical sliders for pedals/hammer weights which contain electrical generation elements which produces electrical power to move the vehicle and returning pedals/hammers weights—electrical springs.

FIG. 3 shows an embodiment wherein the rider's control of the pedals 19 causes generation of electricity which powers an electrical motor 24 that turns the rear wheel 3. An energy generating system is thus provided. A directional slider 21 is provided, as in the embodiment of FIG. 2, but an electrical coil assembly 22 is connected to each pedal 19 and another electrical coil assembly 23 is integrated into the directional slider 21 on each side of the bicycle 2, and thus serves as a stationary static electrical generator coil assembly. These electrical coil assemblies 22, 23 form the energy generating system that converts sliding movement of the weight (considered the combination of the pedal 19 and the electrical coil assembly 22) along the directional slider 21 into rotational force to rotate a flywheel 25.

Movement of the electrical coil assembly 22 relative to the stationary electrical coil assembly 23 on each directional slider 21 causes generation of electricity which is conveyed through wires on the bicycle 1 to a common electrical motor 24. Motor 24 may be housed in a housing attached to the frame 2. Motor 24 is electrically coupled to a flywheel 25 that causes rotation of the main drive sprocket wheel 40 in turn, causing the main drive chain 44 to move and the rear wheel drive sprocket 60 to rotate thereby causing rotation of the rear wheel 3. There may be two motors and flywheels, one for each energy generating system, or a single motor and single flywheel that are powered by both energy generating systems.

In use, the rider sitting on seat 18 puts their feet on the pedals 19, one on each side of the frame 2, and then moves their feet up and down, causing vertical, linear movement of the electrical coil assembly 22 along the directional slider 21 and relative to the stationary electrical coil assembly 23. The uppermost position of the electrical coil assembly 22 is shown in solid lines while the lowermost position is shown in dotted lines. This relative movement of the coil assemblies 22, 23 generates electricity, in a manner known to those skilled in the art. The electrical coil assembly 23 may be integrated into a reciprocating electrical spring. It is possible for the rider to move only one of their feet up and down, and when moving both of their feet up and down, they can move their feet simultaneously in down stroke and up stroke, or alternatively in down and up stroke, i.e., one going down and the other going up.

As in FIG. 2, spring 76 situated at the top of the directional slider 21 limits upward movement of the electrical coil assembly 22 along the directional slider 21 and provides a reciprocating force if the electrical coil assembly 22 should come into contact with the spring 16 in its upward stroke. An optional spring 74 is above spring 76 and aids the function of spring 76. Spring 17 situated at the bottom of the directional slider 21 limits downward movement of the electrical coil assembly 22 along the directional slider 21 and provides a reciprocating force if the electrical coil assembly 22 should come into contact with the spring 17 in its downward stroke. Another spring 15 is connected to the spring 17 and is attached to the frame 2. Electrical wires between the electrical coil assemblies 22, 23 may pass through spring 15, or other parts of the frame 2.

Springs 15, 17, 74, 76 may be reciprocating electrical springs that generate electrical power and returning force at the same time. In this case, the springs 15, 17, 74, 76 are also connected by wires to the motor 24 and provide electrical energy to the motor 24. Electrical springs that generate electricity when contacted by a moving object are known.

Figure 4:
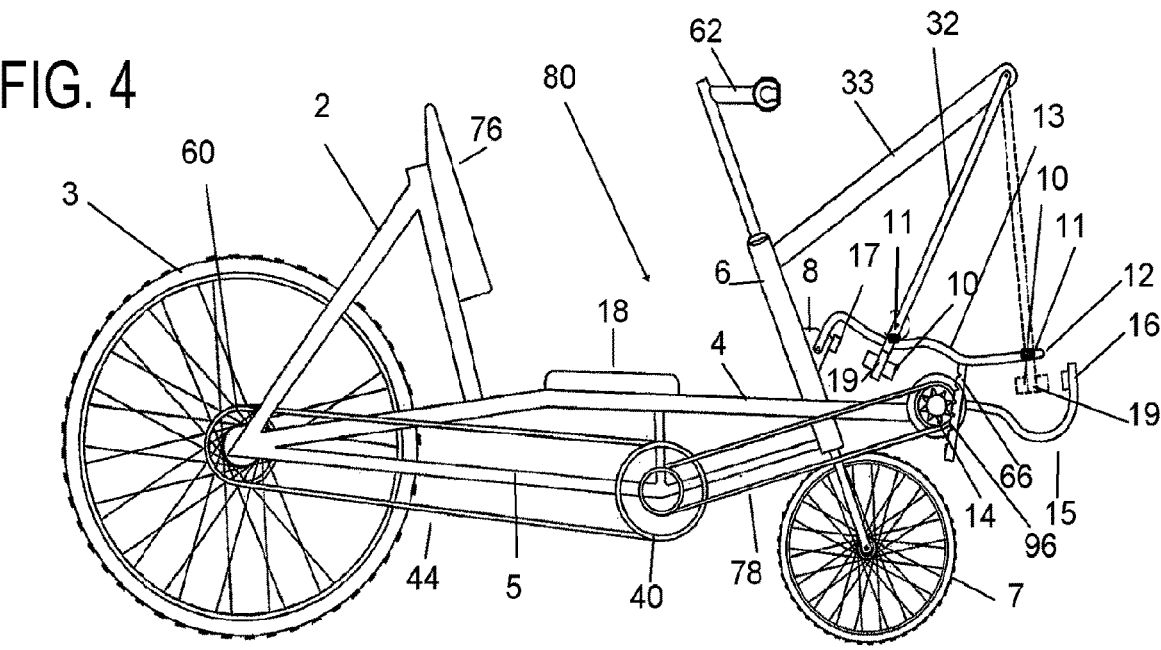
FIG. 4 is a side view of an embodiment of the transmission of the present invention, recumbent human power vehicle with slider/hammer handle associated with slider bracket attached to the steering column.

FIG. 4 shows a bicycle 80 similar to that shown in FIG. 1 but the frame 2 is configured to allow the rider to sit on the seat 18 and rest their back on a backrest 76. Also, the hammer handle 32 is pivotally connected to a pedal slider bracket 33 attached to the frame 2 and specifically to the steering column 6. The weight 10 is attached to a swinging hammer handle 32, e.g., in the same manner that the weight 10 is attached to the hammer handle 9, and the pedal 19 is attached to the weight 10 or hammer handle 32. By pivotally mounting the hammer handle 32 at its upper end to the pedal slider bracket 33, a pivot point for the hammer handle 32 is defined on the pedal slider bracket 33 and the hammer handle 32 swings in a pendulum-type motion between a rearwardmost position shown in solid lines and a forwardmost position shown in dotted lines. Ratchet portion 66 of the leading slider and gear 12 extends from the bump 13, and since the leading slider and gear 12 is generally in a horizontal orientation, the ratchet portion 66 extends in a generally vertical orientation.

The rider puts their feet onto the pedals 19, one on each side of the frame 2 of the bicycle 80, and then pushes the pedal 19, with the connected weight 10, forward causing the hammer handle 32 to swing forward. This swinging movement causes the roller 11 to move along the leading slider and gear 12. As the roller 11 rolls over the bump 13 in the leading slider and gear 12, the ratchet portion 66 of the leading slider and gear 12 is moved downward while in contact with the gear 14 causing rotation of the gear 14, Rotation of gear 14 causes movement of a secondary drive chain 78 only when the hammer handle 32 swings forward and not when the hammer handle 32 swings rearward. This is achieved by an overrunning clutch 96 integrated with the gear 14, as in the embodiments of FIGS. 1 and 2. Thus, the secondary drive chain 78 does not move unless the inner ring of the overrunning clutch 96 is engaged with the outer ring of the overrunning clutch 96, which occurs only when the ratchet portion 66 of the leading slider and gear 12 moves downward and the gear 14 rotates clockwise, but not when the leading slider and gear 12 moves upward and the gear 14 rotates counterclockwise. Movement of the secondary drive chain 78 causes the main drive sprocket wheel 40 to rotate which in turn, causes the main drive chain 44 to move and the rear wheel drive sprocket 60 to rotate thereby causing rotation of the rear wheel 3.

Figure 5:
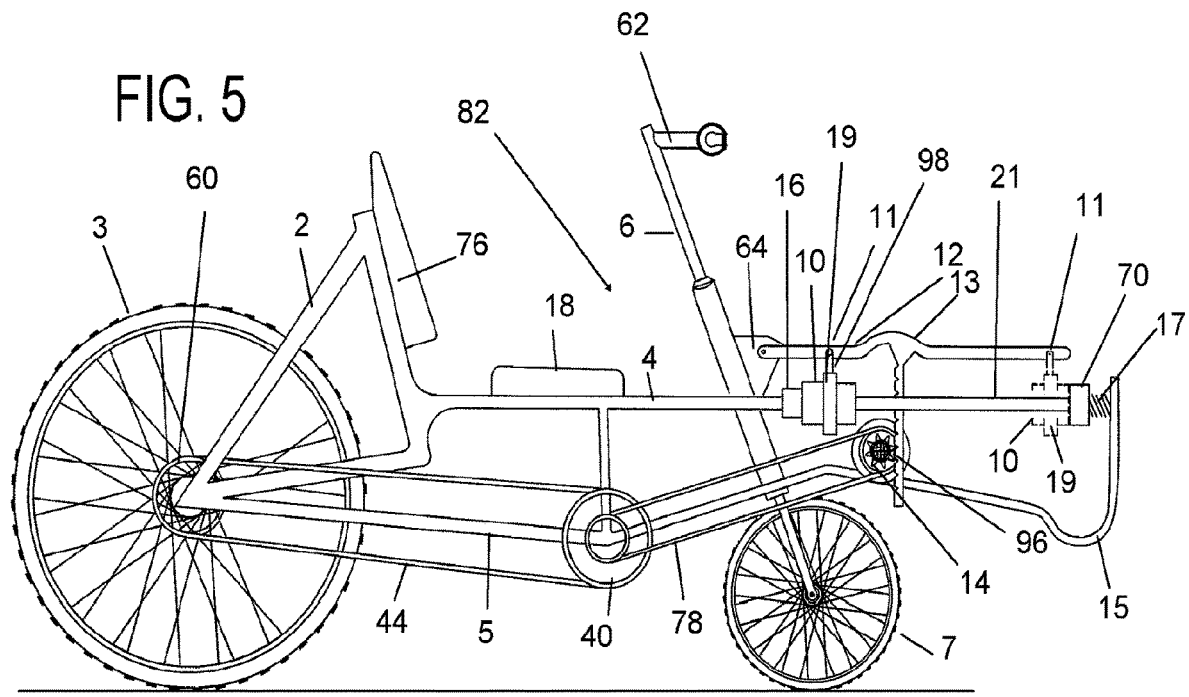
FIG. 5 is a side view of an embodiment of the present invention, recumbent human-powered vehicle with horizontal sliders attached to the frame.

FIG. 5 shows a bicycle 82 similar to that shown in FIG. 2 wherein a directional slider 21 is attached to the frame 2, one on each side of the frame 1. Each directional slider 21 is attached by a bracket 84 to a front part of the frame 2, specifically the steering column 6, to project forward from the frame 2 to position the pedals 19 in a position in which the rider seated on seat 18 and leaning back on backrest 76 can contact the pedals 19.

As in FIG. 2, weight 10 slides along the directional slider 21, and the pedal 19 is attached to the weight 10. Springs 15, 16, 17, 70 provide for controlled movement of the weight 10 and can also generate force upon contact by weight 10. Each leading slider and gear 12 is positioned in a substantially horizontal orientation with the ratchet portion 66 in a substantially vertical orientation. Each roller 11 is coupled to the pedal 19 by a connector or bracket 98 and is able to move forward and rearward at a fixed (vertical) distance from the respective directional slider 21, and as the roller 11 passes through the bump 13, a downward force is exerted on the ratchet portion 66 of the leading slider and gear 12 causing rotation of the gear 14 in contact with the ratchet portion 66.

Rotation of gear 14 causes movement of a secondary drive chain 78 only when the weight 10 slides forward and not when the weight 10 slides rearward. This is achieved by an overrunning clutch 96 integrated with the gear 14, as in the embodiments of FIGS. 1 and 2. Movement of the secondary drive chain 78 causes the main drive sprocket wheel 40 to rotate which in turn, causes the main drive chain 44 to move and the rear wheel drive sprocket 60 to rotate thereby causing rotation of the rear wheel 3.

In this embodiment and the embodiments with a secondary drive chain, e.g., FIG. 4, the roller 11 of each drive mechanism passes through the bump 13 in both strokes, i.e., the forward stroke and the rearward stroke or the up stroke and the down stroke. During the forward or down stroke, the ratchet portion 66 of the leading slider and gear 12 is moved downward or rearward. During the rearward or up stroke, the ratchet portion 66 of the leading slider and gear 12 is moved upward or forward to return it to the initial position. This upward or forward movement does not result in movement of the secondary drive chain 78 in view of the use of the overrunning clutches described below. Thus, the drive mechanism is configured to provide unidirectional movement of the secondary drive chain 78 so that it moves only in one direction during the forward or down stroke of each pedal 19, and not during the reverse rearward or up stroke of each pedal 19.

Figure 6:
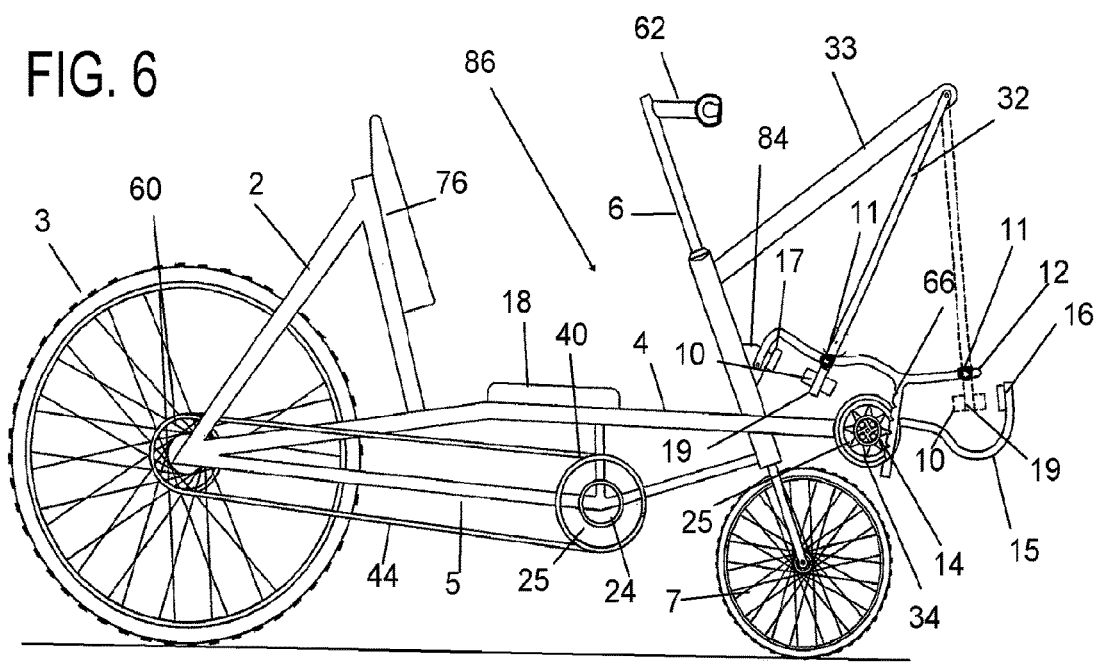
FIG. 6 is a side view of an embodiment of the present invention, incorporating vertical sliders and gears, and for pedals/hammers weights, the gears associated with the generator produces electrical power to move the vehicle.

FIG. 6 shows an embodiment similar to that shown in FIG. 4, but wherein the rider's control of the pedals 19 causes generation of electricity which powers an electrical motor 24 that turns the rear wheel 3. An electrical generator 34 is connected to the gear 14 of each drive mechanism on the sides of the frame 2 of the bicycle 86. As in FIG. 4, the ratchet portion 66 of the leading slider and gear 12 is moved downward, while in contact with the gear 14, upon forward pushing force exerted by the rider on the pedals 19 causing rotation of the gear 14. There are two gears 14 and thus two electrical generators 34.

In use, the rider on seat 18 puts their feet on pedals 19, one on each side of the frame 2, and moves their feet forward and backward, causing swinging of the hammer handle 32 and thus downward and upward movement of the ratchet portion 66 of the leading slider and gear 12 as the roller 11 passes through the bump 13. The forwardmost position of the hammer handle 32 is shown in dotted lines while the rearwardmost position is shown in solid lines. The downward movement causes rotation of the gear 14, but not the upward movement in view of the construction of the gear 14, described below.

Rotation of the gear 14 causes generation of electricity which is conveyed through wires on the bicycle 86, e.g., partly through the top tube 4, to a common electrical motor 24. The manner in which rotation of a component can generate electricity is known to those skilled in the electrical energy generation field. Motor 24 is electrically coupled to a flywheel 25 that causes rotation of the main drive sprocket wheel 40 in turn, causing the main drive chain 44 to move and the rear wheel drive sprocket 60 to rotate thereby causing rotation of the rear wheel 3.

As in FIG. 4, springs 15, 16, 17 limit the swinging movement of the hammer handle 32. If springs 15, 16, 17 are reciprocating electrical springs, they can also generate electrical power and return force when impacted by the weight 10, with this electrical power being conveyed through wires. Thus, springs 15, 16, 17 are also connected by wires to the motor 24 and provide electrical energy to the motor 24. Electrical springs that generate electricity when contacted by a moving object are known.

Figure 7:
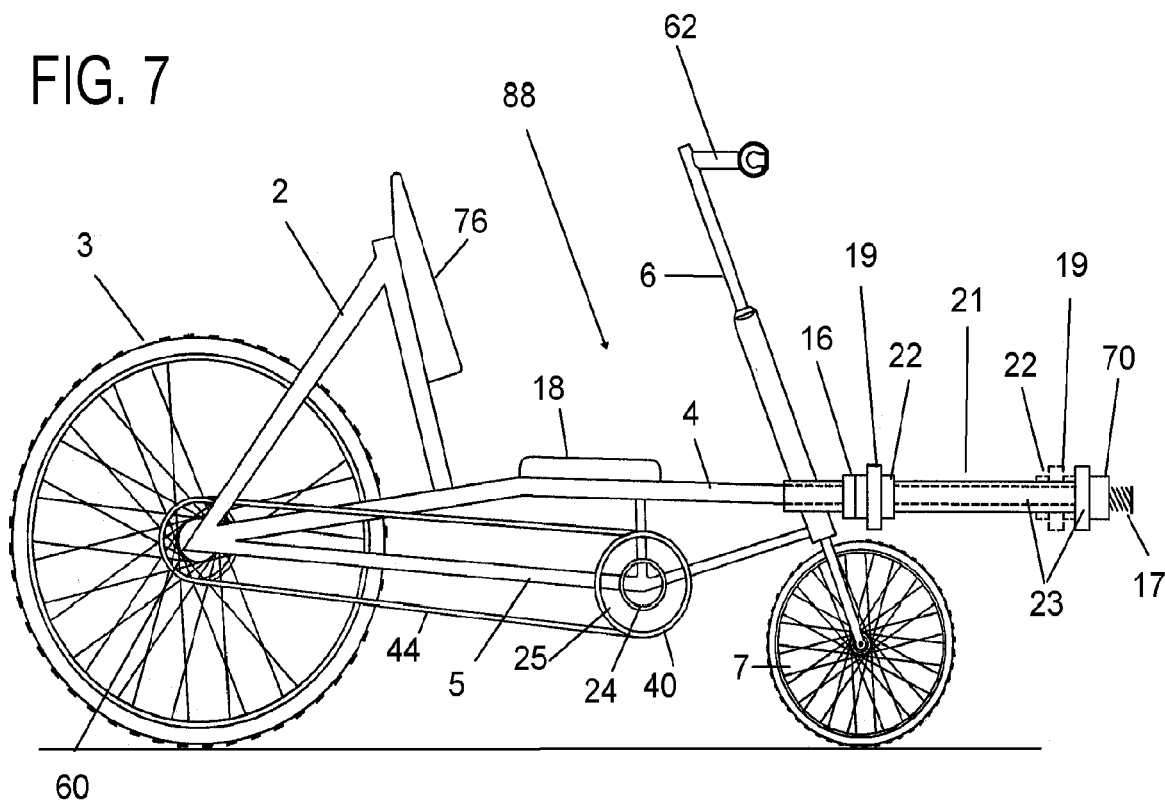
FIG. 7 is a side view of an embodiment of the present invention incorporating horizontal sliders which contain electrical generation elements which produce electrical power to move the vehicle and returning pedals/hammers weights—electrical springs.
Figure 8:
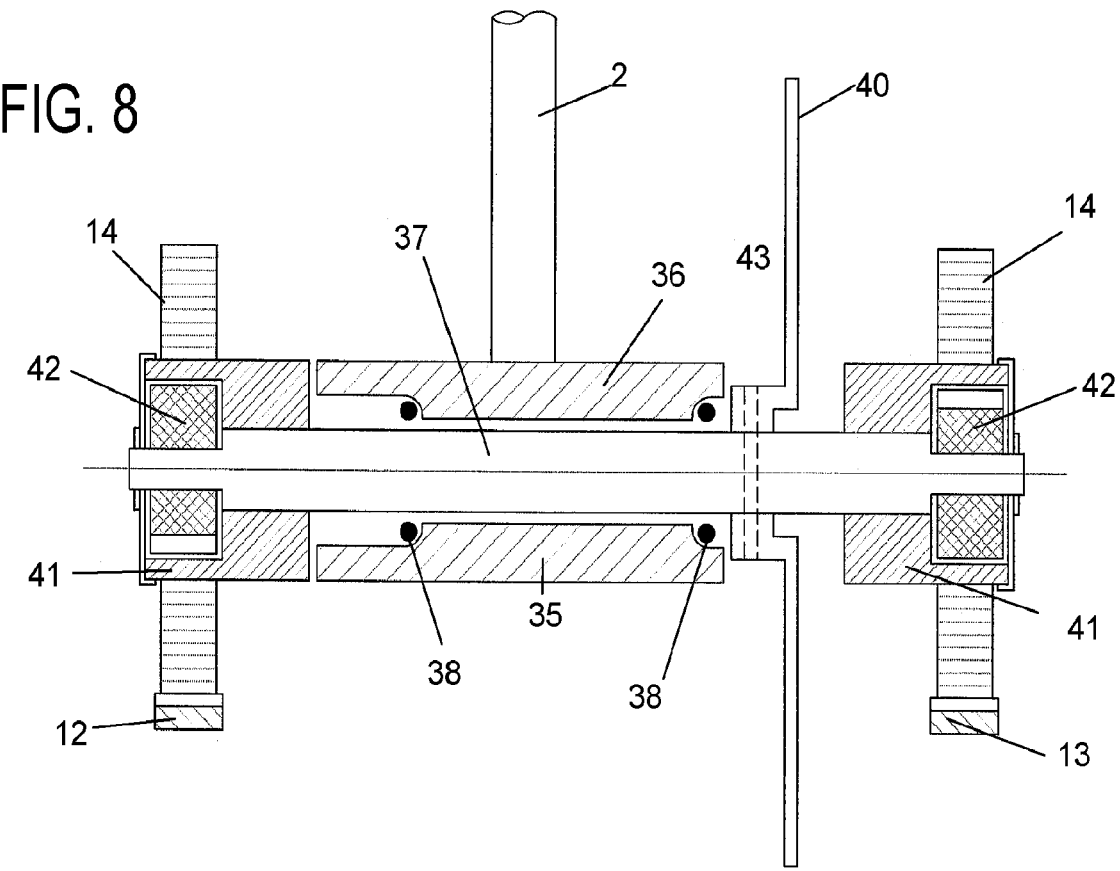
FIG. 8 is a cross-sectional view of a particular embodiment of the transmission of the present invention utilizing sliders and gears.

FIG. 7 shows an embodiment, similar to FIG. 3, wherein the rider's control of the pedals 19 causes generation of electricity which powers an electrical motor 24 that turns the rear wheel 3. The electrical coil assembly 22 is connected to each pedal 19 and another electrical coil assembly 23 is integrated into the directional slider 21 on each side of the bicycle 88, and thus serves as a stationary static electrical generator coil assembly. Movement of the electrical coil assembly 22 relative to the stationary electrical coil assembly 23 on each directional slider 21 causes generation of electricity which is conveyed through wires on the bicycle 88 to a common electrical motor 24. Motor 24 is electrically coupled to a flywheel 25 that causes rotation of the main drive sprocket wheel 40 in turn, causing the main drive chain 44 to move and the rear wheel drive sprocket 60 to rotate thereby causing rotation of the rear wheel 3.

In use, the rider on seat 18 with the back potentially against backrest 76 and puts their feet on pedals 19, one on each side of the frame 2 of the bicycle 88, and then moves their feet forward and backward, causing linear movement of the electrical coil assembly 22 along the directional slider 21 and relative to the stationary electrical coil assembly 23. The rearmost position of the electrical coil assembly 22 is shown in solid lines while the forwardmost position is shown in dotted lines. This relative movement of coil assemblies generates electricity, in a manner known to those skilled in the art. The electrical coil assembly 23 may be integrated into a reciprocating electrical spring. It is possible for the rider to move only one of their feet forward and backward, and when moving both of their feet forward and backward, they can move their feet simultaneously in a forward stroke and a rearward stroke, or alternatively in forward and rearward strokes, i.e., one going forward and the other going rearward.

Spring 70 situated at the rear of the directional slider 21 limits rearward movement of the electrical coil assembly 22 along the directional slider 21 and provides a reciprocating force if the electrical coil assembly 22 should come into contact with the spring 70 in its rearward stroke. Similarly, a spring 16 situated at the front of the directional slider 21 limits forward movement of the electrical coil assembly 22 along the directional slider 21 and provides a reciprocating force if the electrical coil assembly 22 should come into contact with the spring 16 in its forward stroke. Another spring 17 is optionally connected to the spring 70. Electrical wires between the electrical coil assemblies 22, 23 may pass through spring 16, or other parts of the frame 2.

Springs 16, 17, 70 may be reciprocating electrical springs that generate electrical power and returning force at the same time, as mentioned elsewhere herein. Thus, the springs 16, 17, 70 are also connected by wires to the motor 24 and provide electrical energy to the motor 24.

FIGS. 8-11 show the clutch mechanism that allows the rotation of gear 14 in only one direction to cause movement of the main drive chain 40 which may be considered part of the energy transfer systems. For this explanation, the motive stroke will be that stroke that causes the movement of the main drive chain 40 while the return stroke is that stroke that causes return of the weight 10 to a position ready for another motive stroke. In the motive stroke, an outer ring 41 is in engagement with an inner ring 42, while in the return stroke, the outer ring 41 is not in engagement with the inner ring 42, respectively. Also, FIG. 8 clearly shows that there are two drive mechanisms, one on each side of the frame 2.

The gear 14 of the drive mechanism on each side of the frame 2 is shown. Each gear 14 has an opening in which at least a part of the outer ring 41 and at least a part of the inner ring 42 are situated (see also FIG. 1). The inner ring 42 is housed in a cavity in the outer ring 42. The outer ring 41 extends inward toward the frame 2 which the inner ring 42 is mostly housed in a space defined by the outer ring 41. The single main drive sprocket 40 is between a transmission bracket 36 fixed to the frame 2, and the inner ring 41 on one side of the transmission bracket 36. The main drive sprocket 40 is fixed to a transmission axle 37.

The clutch mechanism includes a transmission main chain axis drive 35 having the transmission axle 37 located in the transmission bracket 36 and bearings 38 or possibly hydraulic self-pressure bearings 49 between the inner surface of the transmission bracket 36 and the outer surface of the transmission axle 37 to enable rotation of transmission axle 37 relative to the transmission bracket 35 (see also FIG. 12). To return follower gears 14 in a working position after a motive stroke in which the inner and outer rings 41, 42 rotate counterclockwise in the direction of the arrows in FIG. 9, the outer ring 41 (or 48) is configured to be placed into an idle condition on the return stroke cycle.

Figure 10:
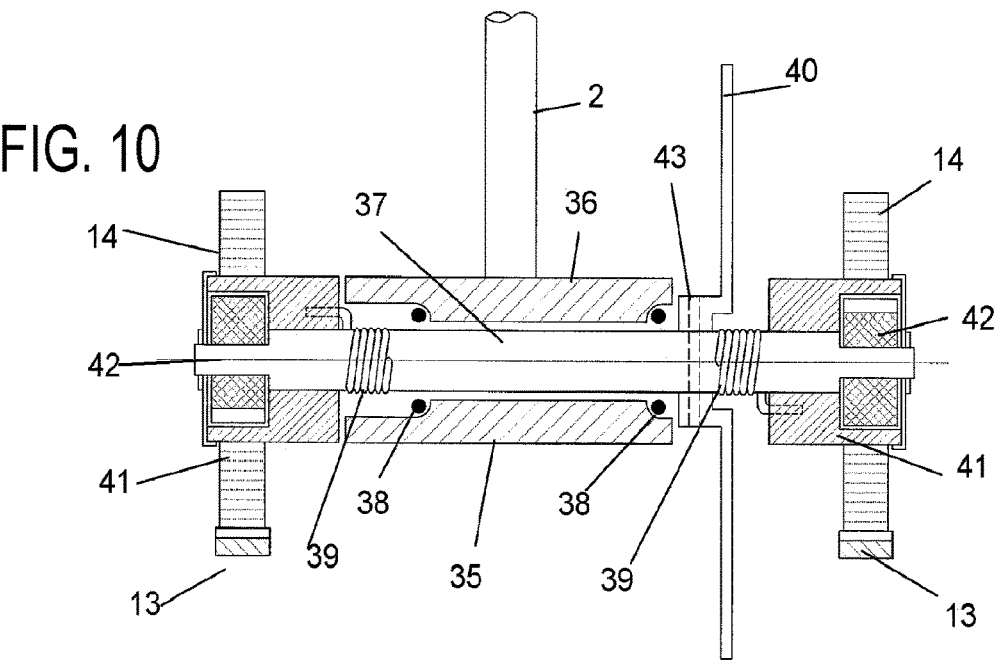
FIG. 10 is a cross-sectional view of a particular embodiment of the transmission of the present invention utilizing spiral torsion returning springs.

A spiral torsion returning spring 39, see FIG. 10, or leading slider and gear 12 rotates the overrunning clutch outer ring 41 or a hydraulic overrunning clutch outer ring 48 in the opposite direction. Then, to perform another motive stroke, the outer rings 41 (or 48) re-engage with the inner ring 42 (or 49) to perform a power stroke cycle and transmit rotational force to transmission axle 37 via the inner ring 42 (or 49), then to the main drive sprocket wheel 40 connected thereto and then to the main drive chain 44 running over the main drive sprocket wheel 40.

Figure 9:
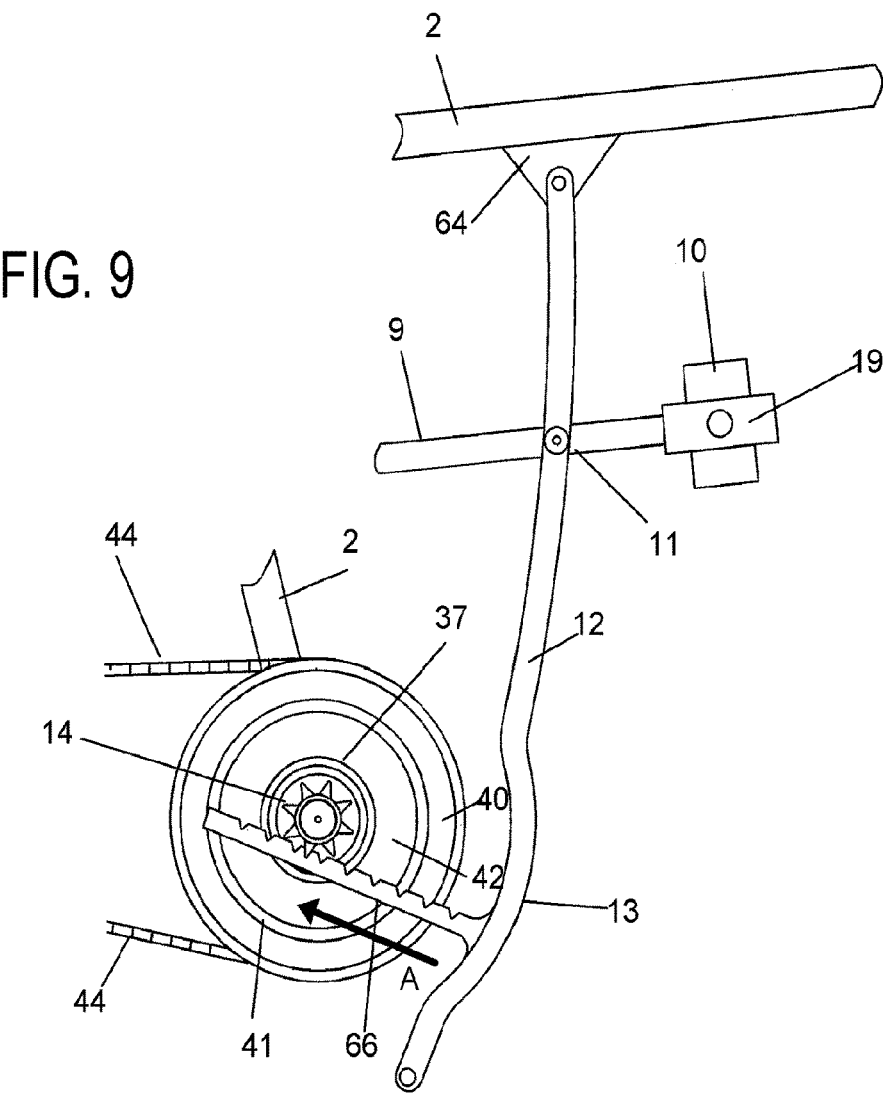
FIG. 9 is a side view of a particular embodiment of the transmission and electrical hammer powered drive mechanism of the present invention utilizing bumps and overrunning clutches.

FIG. 9 shows the direction of rotation of the outer ring 41 that causes rotation of the inner ring 42 in the same rotational direction, i.e., engagement of the inner ring 42 with the outer ring 41. Outer ring 41 is rotated upon the rearward movement of the ratchet portion 66 of the leading slider and gear 12 (in the direction of arrow A) as the roller 11 passes downward through the bump 13. The dotted lines represent the movement of the roller 11, which movement forces the rearward movement of the ratchet portion 66 of the leading slider and gear 12

FIG. 10 shows the torsion spiral returning spring 39 provided to return the overrunning clutch outer ring 41. A torsional spiral returning spring 39 may be situated at each end of the transmission axle 37 proximate the outer rings 41. The torsional spiral returning spring 39 is particularly useful when the leading slider and gear 12 does not return by itself to its initial, motive stroke-ready position. One embodiment wherein such return is not automatic is shown in FIG. 11.

FIG. 11 is a side view of an embodiment of the transmission wherein the pivot point of the leading slider and gear 12 is adjustable. To this end, the pivot point is defined by an axle 46 and instead of bracket 64, a flange 45 with a longitudinal slide slot or aperture 90 is provided. The axle 46 is dimensioned to slide in the aperture 90 while being retained therein. With the configuration, the height of the bump 13 is variable. The axle 46 and/or the aperture 90 can be constructed to provide for defined positions of the axle 46 in the aperture 90 to avoid movement of the axle 46 after setting by the rider and during use. Since the axle 46 can move in the aperture 90, there is no automatic return of the leading slider and gear 12 and thus the torsional spiral returning spring 39 on the transmission axle 37 are used to rotate the outer gear 41 and gear 14 back to their initial positions in which they will be ready for a motive stroke.

FIG. 12 shows a hydraulic overrunning clutch inner ring 47 and outer ring 48 which are connected with follower gear 14. The inner ring 47 is connected to the transmission axle 37 which is rotatably mounted on the frame 2 by hydraulic self-pressure bearings 49 to enable rotation of transmission axle 37 relative to the transmission bracket 36 attached to the frame 2. The transmission main chain axis drive 35 contains the electrical generator 34 connected to a flywheel 25 integrated with the main drive sprocket wheel 40. Hydraulic self-pressure bearing seals 50 seal the hydraulic self-pressure bearings 49.

During the motive stroke, rotation of the gear 14 causes rotation of the overrunning clutch outer ring 48 and the overrunning clutch outer ring 47 engaged therewith, which in turn causes rotation of the transmission axle 37. Rotation of the transmission axle 37 causes rotation of the main drive sprocket wheel 40 connected to the transmission axle 37. Rotation of the main drive sprocket wheel 40 causes rotation of the flywheel 26 and generator 34 thereon relative to a stationary coil 92 mounted on a flange 94 connected to the bracket 35. Relative rotation of the generator 34 to the coil 92 generates electricity in the generator 34 which is directed to the motor 24 (not shown in FIG. 12).

FIG. 13 is a side view of an embodiment of the transmission and inertial hammer powered drive mechanism of the present invention utilizing hydraulic overrunning latches (where are the latches), hydraulic self-pressure bearings 49, electrical generators 34, and flywheels 25 as described with reference to FIG. 12.

In any of the embodiments described above, the left and right power stroke cycles are independent from one another, Because of this independent action, the rider can use both legs simultaneously when necessary to provide more power to the vehicle, such as, for example, when accelerating, riding uphill or carrying larger loads (e.g., passengers in a rickshaw-like configuration), Likewise, the rider may alternate between left and right leg motion such as used in a typical upright or recumbent bicycle, Finally, the vehicle of this invention may be propelled with the use of either the right or left leg in a single-stroke action, FIGS. 14-17 shows a bicycle 110 in accordance with the invention that has a double-stroke inertial hammer-powered gear drive mechanism 112 integral with a bicycle frame 114 (the same titled or identified parts may have the same features as parts described above even though represented with different reference numbers). The bicycle 110 has many standard components found in typical bicycles, such as a rear wheel 116, front wheel 118, steering column 120, main drive sprocket 122 (also referred to as the main drive sprocket plate), main drive chain 124, rear wheel drive sprocket 126, adjustable handlebar 128, and a front fork 130. Bicycle 110 may include alternative or other components known to be used on bicycles as long as they do not interfere with the mechanism 112.

Mechanism 112, of which there is one on each side of the bicycle assuming the bicycle is made for use with both left and right feet of the rider, includes a rigid arm 132, pivotally attached at one end region to a plate 134 attached to the frame 114, a weight 136 attached to the opposite end region of the arm 132, a pedal 138 attached to either the weight 136 or the end region of the arm 132 at which the weight 136 is attached, and a roller 140 rotatably mounted to the arm 132 rearward of the weight 136 and pedal 138. Weight 136 may be connected to the same axle as pedal 138, and the weight 136 situated on an opposite side of the arm 132 from the pedal 138 (see FIG. 16). The pedal 138 may include a strap or basket to better facilitate movement of the pedal 138 in the manner described below. This component constitutes the actuating part of the mechanism 112.

Mechanism 112 also includes a force transmission part which includes a rigid bar 142 pivotally attached at one end region to the frame 114 (for example, defining a pivot axis via a pivot pin 160), and having a rearwardly oriented extension 144 at or proximate to the opposite end region. Bar 142 may be, but is not required to be, hollow as shown, and is also referred as a guide member herein. A link 146 is connected at one end region to the free end of the extension 144 and at an opposite end region to a part of a clutch mechanism 148. Link 146 is a power link or chain and may be a vinyl-coated metal cord, a metal chain or other similar components.

An important feature of the invention is that the bar 142 includes a discernible bump 150. Bump 150 is an example of a deviation radially outward of a radius of curvature that the bar 140 generally follows (represented by the dotted lines in FIG. 14). The dotted lines in FIG. 14, however, represent the permitted path of the bar 140 arising from the fixed length between the roller 140 and the pivot point at which the arm 132 is attached to the frame 114. Bump 150 thereby causes the bar 142 to pivot rearward about the pivot point defined on the frame 114 as the roller 140 passes over the forward surface of the bump 150. This pivotal rearward movement causes rearward movement of extension 144, the effect of which is described below.

An energy transfer system that converts pivotal movement of the guide member (bar 142) into motive power to rotate the rear wheel 116 includes clutch mechanism 148 which is an overrunning clutch, the general design of which is known to those skilled in the transmission field. Generally, an overrunning clutch has outer and inner rings 152 and 154 (see FIG. 17). Rings 152, 154 are alternatively considered or termed races or gears, or other comparable terminology used by those in the transmission field. A drum 156 is connected to the outer ring 154. The link 146 is connected to the drum 156. Outer and inner rings 152, 154 are configured such that when outer ring 154 rotates in one direction (clockwise in the configuration shown in FIG. 14), the inner ring 152 is engaged with the outer ring 154 and rotates as well in the same direction. However, when outer ring 154 rotates in the opposite direction (counterclockwise in the configuration shown in FIG. 14), the inner ring 152 is disengaged with the outer ring 154 and does not rotate.

Figure 14:
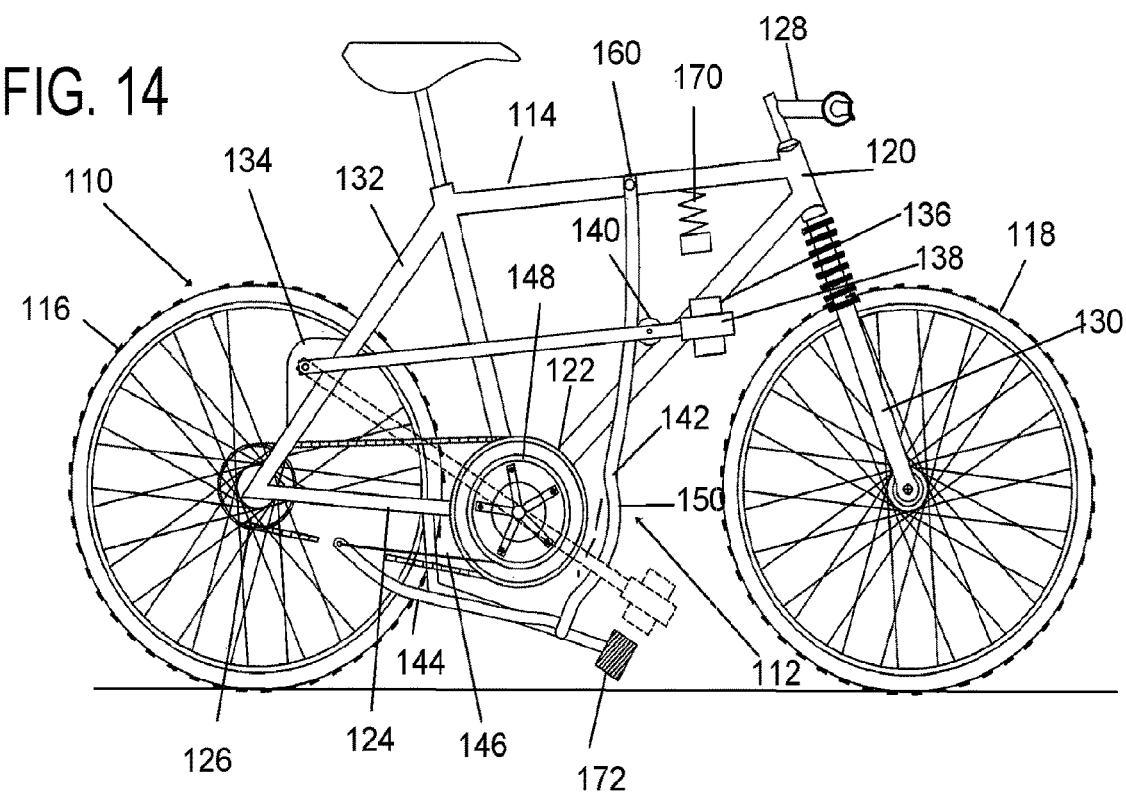
FIG. 14 is a side view of another embodiment of a bicycle of the present invention.
Figure 15:
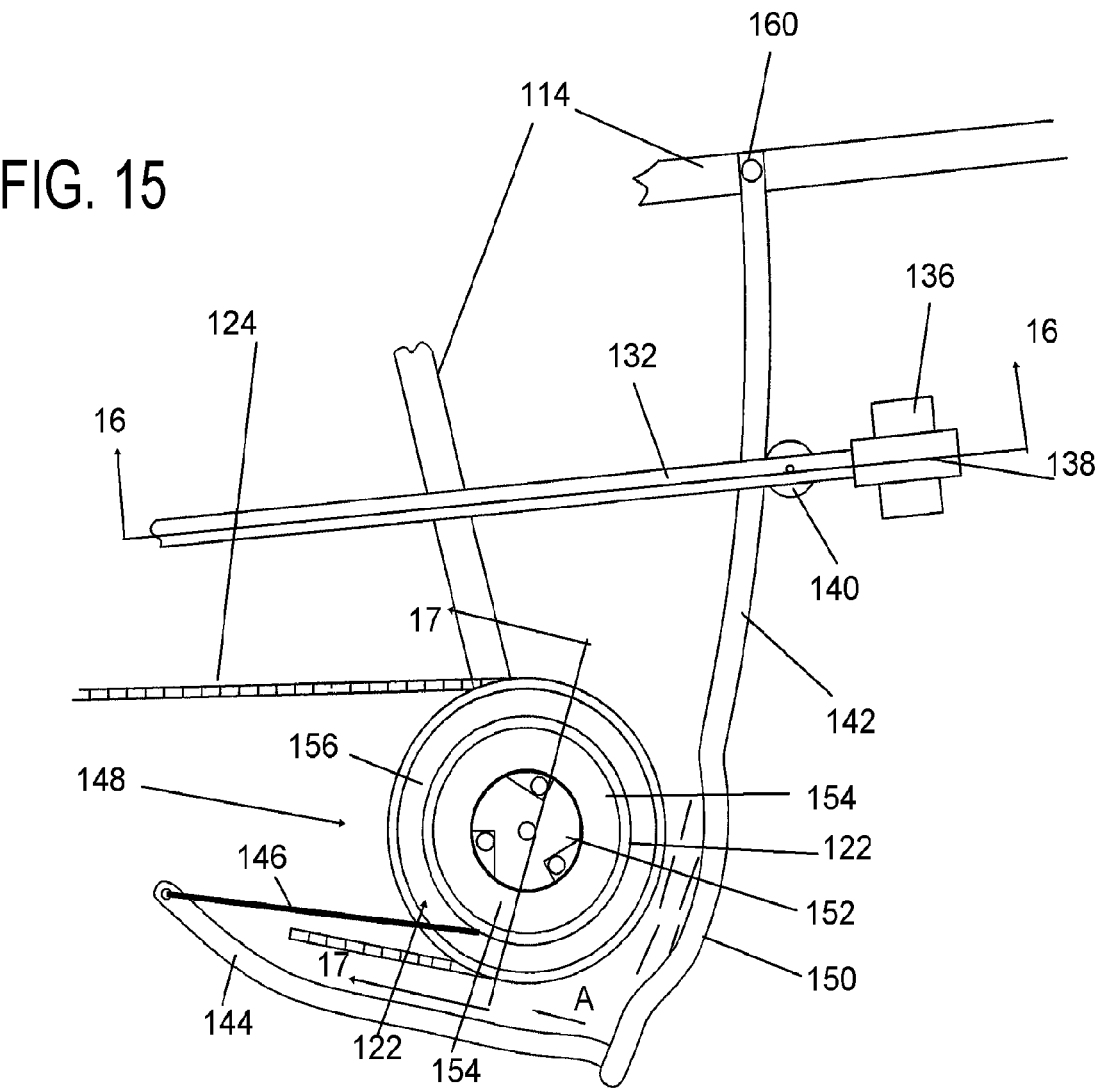
FIG. 15 is an enlarged side view of the transmission mechanism of the bicycle shown in FIG. 14.
Figure 17:
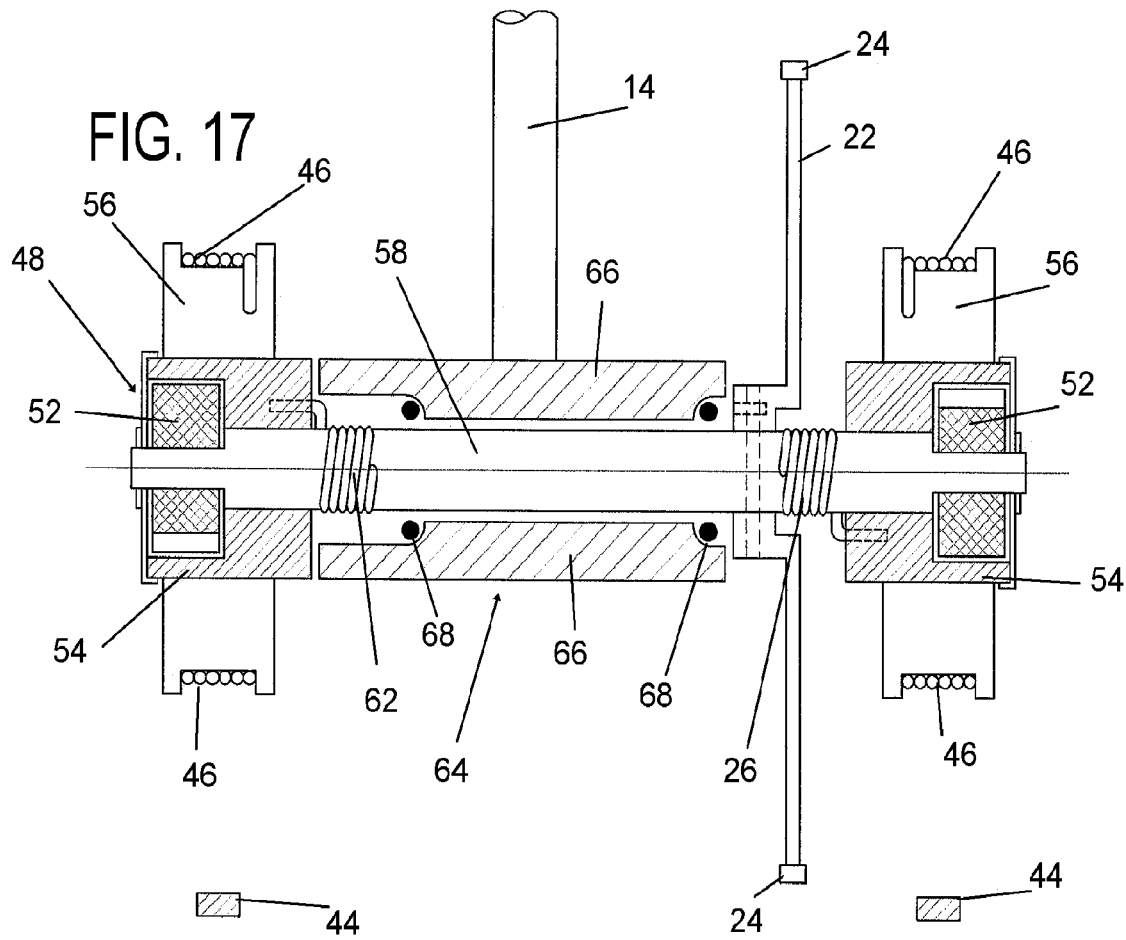
FIG. 17 is a cross-sectional view taken along the line 17-17 in FIG. 15.

Rotation of the inner ring 152 is transmitted to the rear wheel 116 via a main drive sprocket plate 122 which is fixed to a transmission axle 158 to which the inner ring 152 is fixed (see FIG. 17), a drive chain 124 that passes around the outer periphery of the main drive sprocket plate 122 (shown in FIG. 14 but not FIG. 17).

Clockwise rotation of the outer ring 154 is caused by pulling of the link 146, which causes the drum 156 to rotate clockwise and thus the outer ring 154 to rotate clockwise in view of its fixing to the drum 156 (see FIG. 17).

Biasing members, such as spiral torsional springs 162, are provided to cause the counterclockwise rotation of the outer ring 154 (FIG. 17).

Additional features of the clutch mechanism 148 includes a transmission main chain axis drive 164 having the transmission axle 158 located in the transmission bracket 166 and bearings 168 between an inner surface of the transmission bracket 166 and an outer surface of the transmission axle 158 to enable rotation of transmission axle 158 relative to the transmission bracket 166.

Additional features of the bicycle 110 include a set of movement limiters 170, 172, one attached to the frame 114 in a position to limit the upward movement of the arm 132 by preventing upward movement of the weight, and the other attached to the frame 114 in a position below the bar 140 to limit the downward movement of the arm 132. Each movement limiter 170, 172 may include a spring to aid the movement of the arm in the return direction.

Figure 16:
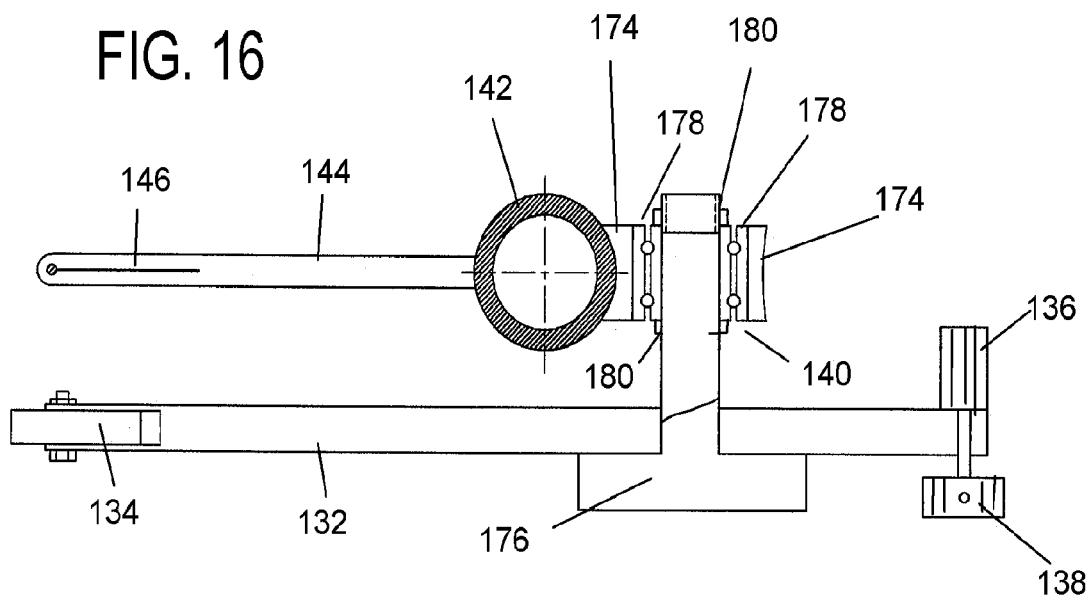
FIG. 16 is a cross-sectional view taken along the line 16-16 in FIG. 15.

Roller 140 and bar 142 can interact with one another in a variety of different ways with the purpose being to allow the roller 140 to roll along the bar 142. As shown in FIG. 16, the roller 140 is situated forward of the bar 142 and includes a roller pad 174 that contacts the outer surface of the bar 142 and is support on a pin or axle 176 by a bearing 178. Axle 176 is a sturdy axle which is fixed to the arm 132. As shown, the fixing structure is a flange 180 that extends through an aperture in the arm 132. Other fixing structures, e.g., a weld, adhesive, bolt, and the like, may be used in the invention. The bearing 178 is fixed on the axle 176 by supports 180. The contour of the pad 174 and the complementary contour of the bar 142 can be different from that shown in FIG. 16. The pad 174 may have a convex outer surface whereas the bar 142 is provided with a concave surface along that side which will be in contact with the pad 174.

In operation, from the state shown in FIG. 14, the rider sits on the seat and puts their feet on the pedals 138. The rider pushes one or both pedals 138 downward, As the pedal 138 moves downward, the arm 132 pivots about its pivot axis on the plate 134 and the roller 140 slides along the bar 142. Until the roller 140 reaches the bump 150, it is in a condition in which it is free-fall and is acquiring energy. That is, it is converting potential energy into kinetic energy, and the magnitude of the change in energy is increased by the presence of the weight 136.

When the roller 140 contacts the bump 150, the bar 142 is pushed rearward, pivoted counterclockwise about the pivot point at which the bar 142 is attached to the frame 114. This rearward pushing causes the extension 144 to move rearward pulling the link 146. By pulling the link 146, the outer ring 154 is rotated clockwise, and in view of the engagement of the inner ring 152 with the outer ring 154, the inner ring 152 is rotated clockwise. This causes the main drive sprocket plate 122 to rotate clockwise, and the drive chain 124 that passes around the outer periphery of the main drive sprocket plate 122 to move and cause rotation of the rear wheel 116.

Once the roller 140 passes by the bump 150, it releases energy and the weight 136 or pedal 138 contacts the movement limiter 172 at the end of the downward movement. During this time, the spring returns the link 146 to the starting position. However, the inner ring 152 is not engaged with the outer ring 154, so the counterclockwise rotation of the outer ring 154 is not transmitted to the inner ring 152.

When the rider moves the pedal 138 upward, over the bump 150 from the bottom, the same effect occurs causing another transference of motive energy to the rear wheel 116. The upward movement of the arm 132 is limited by movement limiter 170.

The rider can therefore propel themselves forward using only one foot, using both feet in the same synced movement (downward at the same time and upward at the same time), or stagger movement (left foot down while right foot up, and vice versa). The rider has extreme versatility in use of the bicycle to move.

Figure 19:
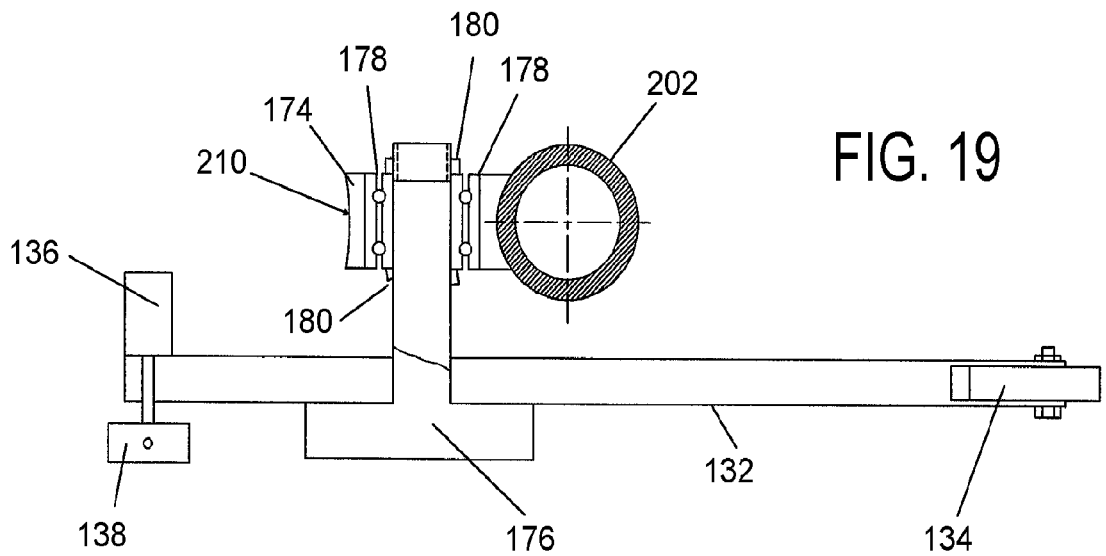
FIG. 19 is a cross-sectional view taken along the line 19-19 in FIG. 18.
Figure 18:
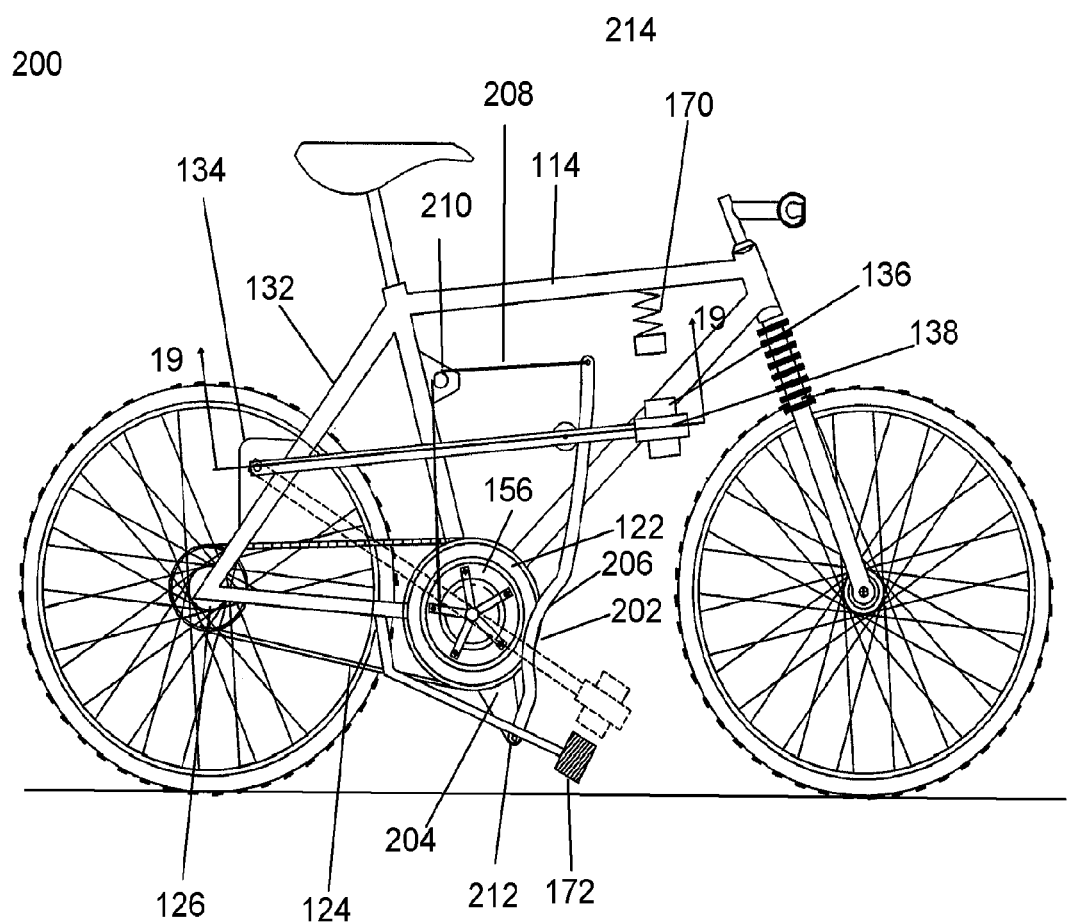
FIG. 18 is a side view of another embodiment of a bicycle of the present invention.

FIGS. 18 and 19 show another embodiment of the invention designated 200 with a similar drive mechanism 112 but the manner in which the drive mechanism 112 is actuated is different. Bicycle 200 includes a bar 202 is attached at a lower pivot point 212 to an extension 204 from the frame 114. Bar 202 has a bump 206 oriented in the rearward direction, so that the roller 140 is positioned rearward of the bar 202, and may be, but is not required to be, hollow as shown. Orientation of the bump 206 in a rearward direction means that the bump 206 projects from a virtual radius of curvature of the bar 202 rearward, or toward the center of the virtual radius of curvature.

A link 208 is attached at one end region to the upper end region 214 of the bar 202, passes around a roller 210 attached to the frame 114 and then attaches to the drum 156. Roller 210 is situated rearward of the bar 202. Link 208 has characteristics similar to link 146. Otherwise, the bicycle 200 has the same features as bicycle 110 and the same reference elements are used to designate the same components.

Operation of bicycle 200 differs from the operation of bicycle 110 in that as the pedal 138 moves downward, the arm 132 pivots about its pivot axis on the plate 134 and the roller 140 slides along a rearward surface of the bar 202. Until the roller 140 reaches the bump 206, it is in a condition in which it is free-fall and is acquiring energy. That is, it is converting potential energy into kinetic energy, and the magnitude of the change in energy is increased by the presence of the weight 136 attached to each pedal 138.

When the roller 140 contacts the bump 206, the bar 202 is pushed forward, pivoted clockwise about the pivot point at which the lower end region of the bar 202 is attached to the frame extension 204. This forward pushing causes the upper end region of the bar 202 to move forward pulling the link 208. By pulling the link 208, the outer ring 154 is rotated clockwise, and in view of the engagement of the inner ring 152 with the outer ring 154, the inner ring 152 is rotated clockwise. This causes the main drive sprocket plate 122 to rotate clockwise, and the drive chain 124 that passes around the outer periphery of the main drive sprocket plate 122 to move and cause rotation of the rear wheel 116.

Once the roller 140 passes by the bump 206, it releases energy and the weight 136 or pedal 138 contacts the movement limiter 172 at the end of the downward movement. During this time, the spring returns the link 206 to the starting position. However, the inner ring 152 is not engaged with the outer ring 154, so the counterclockwise rotation of the outer ring 154 is not transmitted to the inner ring 152.

When the rider moves the pedal 138 upward, over the bump 206 from the bottom, the same effect occurs causing another transference of motive energy to the rear wheel 116. The upward movement of the arm 132 is limited by movement limiter 170.

In the embodiments described above, the left and right power stroke cycles are independent from one another. Because of this independent action, the rider can use both legs simultaneously when necessary to provide more power to the vehicle, such as, for example, when accelerating, riding uphill or carrying larger loads (e.g., passengers in a rickshaw-like configuration). Likewise, the rider may alternate between left and right leg motion such as used in a typical upright or recumbent bicycle. Finally, the vehicle of this invention may be propelled with the use of either the right or left leg in a single-stroke action.

The drive mechanism 112 described above in the bicycle 10 shown in FIGS. 1-4, or the variant shown in FIGS. 5 and 6 can be incorporated into any type of wheeled vehicle, including a recumbent bicycle, a tricycle, etc. Different configurations of a bicycle into which drive mechanism 12 may be incorporated are disclosed in U.S. provisional patent application Ser. No. 62/288,611 filed Jan. 29, 2016, incorporated by reference herein. Also, the drive mechanism 112 may be configured to generate electricity as the inner ring 152 rotates which is stored in a battery on the bicycle 110, 200 and then used to rotate the rear wheel 116, in a similar manner as disclosed in the '611 application. The battery is charged whenever the inner ring 152 rotates. This electrical power is controlled by the rider or a mechanical speed regulator to provide for linear movement of the bicycle 110, 200 in a manner known to those skilled in the art in view of the disclosure herein.

In some embodiments, the rotation of the outer ring 154 may be used by a generator on the bicycle 110, 200 to generate electricity which is either directly used to power a motor associated with one or more of the wheels of the bicycle to provide motive power to the bicycle and/or is stored in a battery for later use. Use of a generator powered by pedal motion is disclosed in the '611 provisional application and can be applied to any of the embodiments disclosed herein.

It is possible to construct the weight/pedal assembly so that it is moved in a linear manner and the linear motion of this assembly interacting with a guide member having a bump to cause the energy transfer system to transfer energy to the rear wheel 116. Application of linear motion instead of pivotal motion is disclosed in the '611 provisional application and can be applied to any of the embodiments disclosed herein.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:
1. A vehicle, comprising:
a frame;
a seat on said frame;
a wheel rotatably mounted on said frame;
an elongate directional slider;
a pedal on said directional slider that slides between first and second positions;
a main drive chain connected to said first wheel;
a main drive sprocket that rotates said main drive chain and thus said first wheel;
a flywheel that rotates said main drive sprocket; and
an energy generating system that converts sliding of said pedal on said directional slider into rotational force to rotate said flywheel,
said energy generating system comprising:
a first electrical coil assembly in connection with said pedal;
a second electrical coil assembly in connection with said directional slider and that cooperates with said first electrical coil assembly to cause generation of electricity; and
an electrical motor that is powered by the generated electricity and is coupled to said flywheel to rotate said flywheel.
2. The vehicle of claim 1, wherein said energy generating system further comprises wires to convey the generated electricity to said electrical motor.
3. The vehicle of claim 1, wherein said electrical motor is electrically coupled to said flywheel.
4. The vehicle of claim 1, further comprising:
an additional directional slider on an opposite side of said frame from a side on which said directional slider is situated, said additional directional slider having one end region connected to said frame and an opposite, free end region; and
an additional pedal on said additional directional slider that slides between first and second positions,
said energy generating system converting sliding of said additional pedal on said additional directional slider into rotational force to rotate said flywheel.
5. The vehicle of claim 4, wherein said energy generating system further comprises:
a third electrical coil assembly in connection with said additional pedal; and
a fourth electrical coil assembly in connection with said additional directional slider and that cooperates with said third electrical coil assembly to cause generation of electricity.
6. The vehicle of claim 4, wherein movement of said pedal on said directional slider is independent of movement of said additional pedal on said additional directional slider.
7. The vehicle of claim 1, wherein said directional slider is vertically oriented on said frame such that said pedal is movable in a vertical, linear movement.
8. The vehicle of claim 1, wherein said directional slider has opposite ends, further comprising at least one spring at a top at least one of the opposite ends of said directional slider in a path of said pedal to limit movement of said pedal on said directional slider.
9. The vehicle of claim 8, wherein said at least one spring includes a reciprocating electrical spring that generates electrical power and returns force at the same time, said at least one spring being part of said energy generating system.
10. The vehicle of claim 8, wherein said directional slider is at least partly vertically oriented on said frame such that said pedal is movable in an at least partly vertical, linear movement, said at least one spring comprising one spring situated at a bottom one of the opposite ends of said directional slider in a downward path of said pedal to limit downward movement of said pedal on said directional slider, and an additional spring at the bottom of said directional slider below said one spring and which is attached to said frame.

11. The vehicle of claim 1, further comprising an additional wheel in front of said wheel such that said additional wheel is a front wheel of the vehicle and said wheel is a rear wheel of the vehicle, said directional slider being situated between said rear wheel and said front wheel.

12. The vehicle of claim 11, further comprising a seat rearward of said directional slider and a handlebar in front of said directional slider.

13. The vehicle of claim 1, wherein said directional slider is horizontally oriented on said frame such that said pedal is movable in a horizontal, linear movement.

14. The vehicle of claim 13, further comprising an additional wheel in front of said wheel such that said additional wheel is a front wheel of the vehicle and said wheel is a rear wheel of the vehicle, said directional slider being situated at least partly over said front wheel or between said rear wheel and said front wheel.

15. The vehicle of claim 14, further comprising:
a seat rearward of said directional slider and a handlebar in front of said directional slider, said seat including a backrest;
a first spring at a front of said directional slider in a forward path of said pedal to limit forward movement of said pedal on said directional slider; and
a second spring at a rear of said directional slider in a rearward path of said pedal to limit rearward movement of said pedal on said directional slider.

16. A vehicle, comprising:
a frame having a top tube;
a seat on said frame;
a wheel rotatably mounted on said frame;
an elongate directional slider;
a pedal on said directional slider that slides between first and second positions;
a main drive chain connected to said first wheel;
a main drive sprocket that rotates said main drive chain and thus said first wheel;
a flywheel that rotates said main drive sprocket; and
an energy generating system that converts sliding of said pedal on said directional slider into rotational force to rotate said flywheel,
said directional slider being attached to said top tube of said frame such that said directional slider is vertically oriented and said pedal on said directional slider is movable vertically.

17. A vehicle, comprising:
a frame;
a seat on said frame;
a wheel rotatably mounted on said frame;
an elongate directional slider having opposite ends;
a pedal on said directional slider that slides between first and second positions;
at least one spring at at least one of the opposite ends of said directional slider in a path of said pedal to limit movement of said pedal on said directional slider;
a main drive chain connected to said first wheel;
a main drive sprocket that rotates said main drive chain and thus said first wheel;
a flywheel that rotates said main drive sprocket; and
an energy generating system that converts sliding of said pedal on said directional slider into rotational force to rotate said flywheel.

18. The vehicle of claim 17, wherein said directional slider is partly vertically oriented on said frame such that the opposite ends of said directional slider are top and bottom ends, said at least one spring includes a top spring at a region of the top end of said directional slider in an upward path of said pedal to limit upward movement of said pedal on said directional slider and a bottom spring at a region of the bottom end of said directional slider in a downward path of said pedal to limit downward movement of said pedal on said directional slider.

19. The vehicle of claim 17, wherein said at least one spring includes a reciprocating electrical spring that generates electrical power and returns force at the same time, said at least one spring being part of said energy generating system.

20. The vehicle of claim 17, wherein said directional slider is horizontally oriented on said frame such that said pedal is movable in a horizontal, linear movement and the opposite ends of said directional slider are front and rear ends, said at least one spring including a first spring at a region of the front end of said directional slider in a forward path of said pedal to limit forward movement of said pedal on said directional slider, and a second spring at a region of the rear end of said directional slider in a rearward path of said pedal to limit rearward movement of said pedal on said directional slider.

* * * * *

UNITED STATES PATENT AND TRADEMARK OFFICE
CERTIFICATE OF CORRECTION

| | |
|---|---|
| PATENT NO. | : 11,718,365 B2 |
| APPLICATION NO. | : 17/133888 |
| DATED | : August 8, 2023 |
| INVENTOR(S) | : Michael Kipnis |

It is certified that error appears in the above-identified patent and that said Letters Patent is hereby corrected as shown below:

In the Claims

Claim 8:
Column 16, Line 55, delete "a top".

Signed and Sealed this
Fifth Day of September, 2023

Katherine Kelly Vidal
*Director of the United States Patent and Trademark Office*